United States Patent
Ell et al.

(10) Patent No.: US 12,195,861 B2
(45) Date of Patent: Jan. 14, 2025

(54) TEST STATION ASSEMBLIES FOR MONITORING CATHODIC PROTECTION OF STRUCTURES AND RELATED METHODS

(71) Applicant: MARATHON PETROLEUM COMPANY LP, Findlay, OH (US)

(72) Inventors: Ryan Grant Ell, Findlay, OH (US); Brandon Daniel Hall, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

(21) Appl. No.: 18/386,563

(22) Filed: Nov. 2, 2023

(65) Prior Publication Data

US 2024/0060189 A1 Feb. 22, 2024

Related U.S. Application Data

(60) Division of application No. 18/232,855, filed on Aug. 11, 2023, which is a continuation-in-part of (Continued)

(51) Int. Cl.
  *C23F 13/22* (2006.01)
  *G01N 17/04* (2006.01)
(52) U.S. Cl.
  CPC ........... *C23F 13/22* (2013.01); *G01N 17/046* (2013.01)
(58) Field of Classification Search
  CPC ....... G01N 17/00; G01N 17/006; G01N 17/02
  See application file for complete search history.

(56) References Cited

U.S. PATENT DOCUMENTS 2,626,627 A 1/1953 Jung et al.
2,864,252 A 12/1958 Schaschl
(Continued)

FOREIGN PATENT DOCUMENTS

AU 2010241217 11/2010
AU 2013202839 5/2014
(Continued)

OTHER PUBLICATIONS

Alexandrakis et al.,"Marine Transportation for Carbon Capture and Sequestration (CCS)", Department of Civil and Environmental Engineering, Thesis, Massachusetts Institute of Technology, Jun. 2010.

(Continued)

*Primary Examiner* — Tung X Nguyen
(74) *Attorney, Agent, or Firm* — Womble Bond Dickinson (US) LLP

(57) ABSTRACT

An example test station assembly of a cathodic protection monitoring assembly includes a face plate including a plurality of openings. In addition, the test station assembly includes a plurality of test posts to pass through the plurality of openings. Further, the test station assembly includes a plurality of electrically non-conductive identification indicators to connect to the plurality of test posts on the face plate. Each of the plurality of identification indicators including one or more identifying characteristics to identify a corresponding voltage source of a plurality of underground voltage sources associated with an at least partially buried structure, a cathodic protection system for the buried structure, or the cathodic protection monitoring assembly. Still further, the test station assembly includes a plurality of electrical conductors to electrically connect the plurality of test posts to the plurality of underground voltage sources.

20 Claims, 12 Drawing Sheets

Related U.S. Application Data application No. 17/886,178, filed on Aug. 11, 2022, now Pat. No. 11,807,945, which is a division of application No. 17/805,801, filed on Jun. 7, 2022, now Pat. No. 11,447,877.

(60) Provisional application No. 63/513,391, filed on Jul. 13, 2023, provisional application No. 63/466,062, filed on May 12, 2023, provisional application No. 63/466,056, filed on May 12, 2023, provisional application No. 63/365,102, filed on May 20, 2022, provisional application No. 63/260,622, filed on Aug. 26, 2021.

(56) References Cited

U.S. PATENT DOCUMENTS

| | | |
|---|---|---|
| 3,087,311 A | 4/1963 | Rousseau |
| 3,303,525 A | 2/1967 | Peoples |
| 3,398,071 A | 8/1968 | Bagno |
| 3,504,686 A | 4/1970 | Cooper et al. |
| 3,593,555 A | 7/1971 | Grosko |
| 3,608,869 A | 9/1971 | Woodle |
| 3,672,180 A | 6/1972 | Davis |
| 3,725,669 A | 4/1973 | Tatum |
| 3,807,433 A | 4/1974 | Byrd |
| 3,809,113 A | 5/1974 | Grove |
| 3,925,592 A | 12/1975 | Webb |
| 3,961,493 A | 6/1976 | Nolan, Jr. |
| 4,010,779 A | 3/1977 | Pollock et al. |
| 4,073,303 A | 2/1978 | Foley, Jr. |
| 4,109,677 A | 8/1978 | Burnside |
| 4,202,351 A | 5/1980 | Biche |
| 4,229,064 A | 10/1980 | Vetter et al. |
| 4,242,533 A | 12/1980 | Cott |
| 4,289,163 A | 9/1981 | Pierson |
| 4,294,378 A | 10/1981 | Rabinovich |
| 4,320,775 A | 3/1982 | Stirling et al. |
| 4,357,576 A | 11/1982 | Hickam et al. |
| 4,420,008 A | 12/1983 | Shu |
| 4,457,037 A | 7/1984 | Rylander |
| 4,481,474 A | 11/1984 | Gerrit |
| 4,488,570 A | 12/1984 | Jiskoot |
| 4,630,685 A | 12/1986 | Huck et al. |
| 4,690,587 A | 9/1987 | Petter |
| 4,744,305 A | 5/1988 | Lim et al. |
| 4,788,093 A | 11/1988 | Murata et al. |
| 4,794,331 A | 12/1988 | Schweitzer, Jr. |
| 4,848,082 A | 7/1989 | Takahashi |
| 4,897,226 A | 1/1990 | Hoyle et al. |
| 4,904,932 A | 2/1990 | Schweitzer, Jr. |
| 4,964,732 A | 10/1990 | Cadeo et al. |
| 5,050,064 A | 9/1991 | Mayhew |
| 5,095,977 A | 3/1992 | Ford |
| 5,129,432 A | 7/1992 | Dugger |
| 5,191,537 A | 3/1993 | Edge |
| 5,305,631 A | 4/1994 | Whited |
| 5,367,882 A | 11/1994 | Lievens et al. |
| 5,383,243 A | 1/1995 | Thacker |
| 5,423,607 A | 6/1995 | Jones |
| 5,469,830 A | 11/1995 | Gonzalez |
| 5,516,967 A | 5/1996 | Pandey |
| 5,533,912 A | 7/1996 | Fillinger |
| 5,562,133 A | 10/1996 | Mitchell |
| 5,595,709 A | 1/1997 | Klemp |
| 5,603,360 A | 2/1997 | Teel |
| 5,627,749 A | 5/1997 | Waterman et al. |
| 5,660,602 A | 8/1997 | Collier, Jr. |
| 5,661,623 A | 8/1997 | McDonald |
| 5,783,916 A | 7/1998 | Blackburn |
| 5,814,982 A | 9/1998 | Thompson et al. |
| 5,832,967 A | 11/1998 | Andersson |
| 5,873,916 A | 2/1999 | Cemenska et al. |
| 5,887,974 A | 3/1999 | Pozniak |
| 5,895,347 A | 4/1999 | Doyle |
| 5,906,648 A | 5/1999 | Zoratti et al. |
| 5,906,877 A | 5/1999 | Popper et al. |
| 5,939,166 A | 8/1999 | Cheng et al. |
| 5,962,774 A | 10/1999 | Mowry |
| 5,973,593 A | 10/1999 | Botella |
| 5,993,054 A | 11/1999 | Tan et al. |
| 6,022,421 A | 2/2000 | Bath |
| 6,050,844 A | 4/2000 | Johnson |
| 6,065,903 A | 5/2000 | Doyle |
| 6,077,340 A | 6/2000 | Doyle |
| 6,077,418 A | 6/2000 | Iseri et al. |
| 6,098,601 A | 8/2000 | Reddy |
| 6,111,021 A | 8/2000 | Nakahama et al. |
| 6,149,351 A | 11/2000 | Doyle |
| 6,186,193 B1 | 2/2001 | Phallen et al. |
| 6,220,747 B1 | 4/2001 | Gosselin |
| 6,243,483 B1 | 6/2001 | Petrou et al. |
| 6,328,877 B1 | 12/2001 | Bushman |
| 6,333,374 B1 | 12/2001 | Chen |
| 6,346,813 B1 | 2/2002 | Kleinberg |
| 6,383,237 B1 | 5/2002 | Langer et al. |
| 6,427,384 B1 | 8/2002 | Davis, Jr. |
| 6,478,353 B1 | 11/2002 | Barrozo |
| 6,679,302 B1 | 1/2004 | Mattingly et al. |
| 6,719,921 B2 | 4/2004 | Steinberger et al. |
| 6,799,883 B1 | 10/2004 | Urquhart et al. |
| 6,834,531 B2 | 12/2004 | Rust |
| 6,840,292 B2 | 1/2005 | Hart et al. |
| 6,851,916 B2 | 2/2005 | Schmidt |
| 6,980,647 B1 | 12/2005 | Daugherty et al. |
| 6,987,877 B2 | 1/2006 | Paz-Pujalt et al. |
| 7,032,629 B1 | 4/2006 | Mattingly et al. |
| 7,091,421 B2 | 8/2006 | Kukita et al. |
| 7,168,464 B2 | 1/2007 | Diggins |
| 7,186,321 B2 | 3/2007 | Benham |
| 7,258,710 B2 | 8/2007 | Caro et al. |
| 7,275,366 B2 | 10/2007 | Powell et al. |
| 7,294,913 B2 | 11/2007 | Fischer et al. |
| 7,385,681 B2 | 6/2008 | Ninomiya et al. |
| 7,444,996 B2 | 11/2008 | Potier |
| 7,459,067 B2 | 12/2008 | Dunn et al. |
| 7,564,540 B2 | 7/2009 | Paulson |
| 7,631,671 B2 | 12/2009 | Mattingly et al. |
| 7,729,561 B1 | 6/2010 | Boland et al. |
| 7,749,308 B2 | 7/2010 | McCully |
| 7,810,988 B2 | 10/2010 | Kamimura et al. |
| 7,815,744 B2 | 10/2010 | Abney et al. |
| 7,832,338 B2 | 11/2010 | Caro et al. |
| 7,879,204 B2 | 2/2011 | Funahashi |
| 8,075,651 B2 | 12/2011 | Caro et al. |
| 8,282,265 B2 | 10/2012 | Breithhaupt |
| 8,299,811 B2 | 10/2012 | Wing |
| 8,312,584 B2 | 11/2012 | Hodde |
| 8,327,631 B2 | 12/2012 | Caro et al. |
| 8,368,405 B2 | 2/2013 | Siebens |
| 8,376,432 B1 | 2/2013 | Halger et al. |
| 8,402,746 B2 | 3/2013 | Powell et al. |
| 8,413,484 B2 | 4/2013 | Lubkowitz |
| 8,414,781 B2 | 4/2013 | Berard |
| 8,577,518 B2 | 11/2013 | Linden et al. |
| 8,597,380 B2 | 12/2013 | Buchanan |
| 8,616,760 B2 | 12/2013 | Williams et al. |
| 8,632,359 B2 | 1/2014 | Grimm |
| 8,647,162 B2 | 2/2014 | Henriksson et al. |
| 8,748,677 B2 | 6/2014 | Buchanan |
| 8,808,415 B2 | 8/2014 | Caro et al. |
| 8,979,982 B2 | 3/2015 | Jordan et al. |
| 9,038,855 B2 | 5/2015 | Lurcott et al. |
| 9,162,944 B2 | 10/2015 | Bennett et al. |
| 9,175,235 B2 | 11/2015 | Kastner |
| 9,222,480 B2 | 12/2015 | Younes et al. |
| 9,310,016 B2 | 4/2016 | Hodde |
| 9,329,066 B2 | 5/2016 | Skarping |
| 9,363,462 B2 | 6/2016 | Yoel |
| 9,388,350 B2 | 7/2016 | Buchanan |
| 9,518,693 B2 | 12/2016 | Hodde |
| 9,550,247 B2 | 1/2017 | Smith |
| 9,643,135 B1 | 5/2017 | Mazzei et al. |
| 9,945,333 B2 | 4/2018 | Kopinsky |

(56) References Cited

U.S. PATENT DOCUMENTS

| | | |
|---|---|---|
| 10,001,240 B1 | 6/2018 | Dray et al. |
| 10,012,340 B1 | 7/2018 | Dray et al. |
| 10,024,768 B1 | 7/2018 | Johnsen |
| 10,094,508 B1 | 10/2018 | Dray et al. |
| 10,168,255 B1 | 1/2019 | Johnsen |
| 10,196,243 B1 | 2/2019 | Wells |
| 10,197,206 B1 | 2/2019 | Dray et al. |
| 10,247,643 B1 | 4/2019 | Johnsen |
| 10,261,279 B1 | 4/2019 | Potter |
| 10,287,940 B2 | 5/2019 | Tonsich |
| 10,345,221 B1 | 7/2019 | Silverman |
| 10,364,718 B2 | 7/2019 | Eddaoudi et al. |
| 10,386,260 B2 | 8/2019 | Dudek |
| 10,408,377 B1 | 9/2019 | Dray et al. |
| 10,486,946 B1 | 11/2019 | Wells |
| 10,501,385 B1 | 12/2019 | Buckner et al. |
| 10,563,555 B2 | 2/2020 | Hamad |
| 10,570,581 B2 | 2/2020 | Faivre |
| 10,605,144 B2 | 3/2020 | Kobayashi |
| 10,633,830 B2 | 4/2020 | Shibamori |
| 10,655,774 B1 | 5/2020 | Dray et al. |
| 10,657,443 B2 | 5/2020 | Araujo et al. |
| 10,688,686 B2 | 6/2020 | Fadhel et al. |
| 10,756,459 B2 | 8/2020 | Jongsma |
| 10,833,434 B1 | 11/2020 | Tassell, Jr. |
| 10,943,357 B2 | 3/2021 | Badawy et al. |
| 10,948,471 B1 | 3/2021 | MacMullin et al. |
| 10,953,960 B1 | 3/2021 | Sharp |
| 10,962,437 B1 | 3/2021 | Nottrott et al. |
| 10,970,927 B2 | 4/2021 | Sharp |
| 10,990,114 B1 | 4/2021 | Miller |
| 10,997,707 B1 | 5/2021 | Katz et al. |
| 11,010,608 B2 | 5/2021 | Adam et al. |
| 11,027,304 B2 | 6/2021 | Donaldson |
| 11,112,308 B2 | 9/2021 | Kreitinger et al. |
| 11,125,391 B2 | 9/2021 | Al Khowaiter et al. |
| 11,132,008 B2 | 9/2021 | Miller |
| 11,164,406 B2 | 11/2021 | Meroux et al. |
| 11,221,107 B2 | 1/2022 | Du et al. |
| 11,247,184 B2 | 2/2022 | Miller |
| 11,325,687 B1 | 5/2022 | Sharp |
| 11,332,070 B2 | 5/2022 | Holden et al. |
| 11,345,455 B2 | 5/2022 | Sharp |
| 11,416,012 B2 | 8/2022 | Miller |
| 11,428,600 B2 | 8/2022 | Dankers et al. |
| 11,428,622 B2 | 8/2022 | Borin et al. |
| 11,441,088 B2 | 9/2022 | Robbins |
| 11,447,877 B1 | 9/2022 | Ell |
| 11,559,774 B2 | 1/2023 | Miller |
| 11,565,221 B2 | 1/2023 | Miller |
| 11,578,638 B2 | 2/2023 | Thobe |
| 11,578,836 B2 | 2/2023 | Thobe |
| 11,596,910 B2 | 3/2023 | Miller |
| 11,607,654 B2 | 3/2023 | Miller |
| 11,655,748 B1 | 5/2023 | Thobe |
| 11,655,940 B2 | 5/2023 | Thobe |
| 11,662,750 B2 | 5/2023 | Miller |
| 11,686,070 B1 | 6/2023 | Jordan et al. |
| 11,715,950 B2 | 8/2023 | Miller et al. |
| 11,720,526 B2 | 8/2023 | Miller et al. |
| 11,739,679 B2 | 8/2023 | Thobe |
| 11,752,472 B2 | 9/2023 | Miller |
| 11,754,225 B2 | 9/2023 | Thobe |
| 11,761,366 B2 | 9/2023 | Thobe |
| 11,774,042 B2 | 10/2023 | Thobe |
| 11,794,153 B2 | 10/2023 | Miller |
| 11,807,945 B2 | 11/2023 | Ell |
| 11,808,013 B1 | 11/2023 | Jordan et al. |
| 11,815,227 B2 | 11/2023 | Thobe |
| 11,920,504 B2 | 3/2024 | Thobe |
| 11,965,317 B2 | 4/2024 | Jordan |
| 11,988,336 B2 | 5/2024 | Thobe |
| 12,000,538 B2 | 6/2024 | Thobe |
| 12,006,014 B1 | 6/2024 | Ernst |
| 12,011,697 B2 | 6/2024 | Miller |
| 12,012,082 B1 | 6/2024 | Pittman, Jr. |
| 12,012,883 B2 | 6/2024 | Thobe |
| 12,043,361 B1 | 7/2024 | Ernst |
| 12,043,905 B2 | 7/2024 | Ell |
| 12,043,906 B2 | 7/2024 | Ell |
| 12,066,843 B2 | 8/2024 | Miller |
| 12,087,002 B1 | 9/2024 | Miller et al. |
| 12,109,543 B2 | 10/2024 | Miller |
| 12,128,369 B2 | 10/2024 | Miller |
| 12,129,559 B2 | 10/2024 | Ell |
| 2002/0014068 A1 | 2/2002 | Mittricker et al. |
| 2002/0178806 A1 | 12/2002 | Valentine |
| 2003/0041518 A1 | 3/2003 | Wallace et al. |
| 2003/0121481 A1 | 7/2003 | Dodd et al. |
| 2003/0158630 A1 | 8/2003 | Pham et al. |
| 2003/0167660 A1 | 9/2003 | Kondou |
| 2003/0178994 A1 | 9/2003 | Hurlimann et al. |
| 2003/0188536 A1 | 10/2003 | Mittricker |
| 2003/0197622 A1 | 10/2003 | Reynard et al. |
| 2003/0227821 A1 | 12/2003 | Bae et al. |
| 2004/0057334 A1 | 3/2004 | Wilmer et al. |
| 2004/0058597 A1 | 3/2004 | Matsuda |
| 2004/0067126 A1 | 4/2004 | Schmidt |
| 2004/0125688 A1 | 7/2004 | Kelley et al. |
| 2004/0249105 A1 | 12/2004 | Nolte et al. |
| 2004/0265653 A1 | 12/2004 | Buechi et al. |
| 2005/0007450 A1 | 1/2005 | Hill et al. |
| 2005/0058016 A1 | 3/2005 | Smith et al. |
| 2005/0146437 A1 | 7/2005 | Ward |
| 2005/0150820 A1 | 7/2005 | Guo |
| 2005/0154132 A1 | 7/2005 | Hakuta et al. |
| 2005/0284333 A1 | 12/2005 | Falkiewicz |
| 2006/0125826 A1 | 6/2006 | Lubkowitz |
| 2006/0263283 A1 | 11/2006 | Egan |
| 2006/0278304 A1 | 12/2006 | Mattingly et al. |
| 2007/0175511 A1 | 8/2007 | Doerr |
| 2007/0181083 A1 | 8/2007 | Fulton |
| 2008/0092625 A1 | 4/2008 | Hinnrichs |
| 2008/0113884 A1 | 5/2008 | Campbell et al. |
| 2008/0115834 A1 | 5/2008 | Geoffrion et al. |
| 2008/0149481 A1 | 6/2008 | Hurt |
| 2008/0283083 A1 | 11/2008 | Piao |
| 2009/0009308 A1 | 1/2009 | Date et al. |
| 2009/0107111 A1 | 4/2009 | Oliver |
| 2009/0154288 A1 | 6/2009 | Heathman |
| 2009/0175738 A1 | 7/2009 | Shaimi |
| 2009/0183498 A1 | 7/2009 | Uchida et al. |
| 2009/0188565 A1 | 7/2009 | Satake |
| 2009/0197489 A1 | 8/2009 | Caro |
| 2010/0031825 A1 | 2/2010 | Kemp |
| 2010/0049410 A1 | 2/2010 | McKee |
| 2010/0058666 A1 | 3/2010 | Kim |
| 2010/0198775 A1 | 8/2010 | Rousselle |
| 2011/0265449 A1 | 11/2011 | Powell |
| 2012/0027298 A1 | 2/2012 | Dow |
| 2012/0092835 A1 | 4/2012 | Miller |
| 2012/0143560 A1 | 6/2012 | Tabet et al. |
| 2012/0185220 A1 | 7/2012 | Shippen |
| 2012/0276379 A1 | 11/2012 | Daniels et al. |
| 2012/0304625 A1 | 12/2012 | Daikoku |
| 2013/0035824 A1 | 2/2013 | Nakamura |
| 2013/0048094 A1 | 2/2013 | Ballantyne |
| 2013/0062258 A1 | 3/2013 | Ophus |
| 2013/0125323 A1 | 5/2013 | Henderson |
| 2013/0176656 A1 | 7/2013 | Kaisser |
| 2013/0186671 A1 | 7/2013 | Theis |
| 2013/0201025 A1 | 8/2013 | Kamalakannan et al. |
| 2013/0245524 A1 | 9/2013 | Schofield |
| 2013/0293884 A1 | 11/2013 | Lee et al. |
| 2013/0299500 A1 | 11/2013 | McKinnon |
| 2013/0317959 A1 | 11/2013 | Joos |
| 2014/0002639 A1 | 1/2014 | Cheben et al. |
| 2014/0008926 A1 | 1/2014 | Allen |
| 2014/0062490 A1 | 3/2014 | Neuman et al. |
| 2014/0090379 A1 | 4/2014 | Powell et al. |
| 2014/0121622 A1 | 5/2014 | Jackson et al. |
| 2014/0133824 A1 | 5/2014 | Yoel |
| 2014/0158616 A1 | 6/2014 | Govind et al. |
| 2014/0158632 A1 | 6/2014 | Govind et al. |

(56) References Cited

U.S. PATENT DOCUMENTS

| | | | |
|---|---|---|---|
| 2014/0171538 A1 | 6/2014 | Daniels et al. |
| 2014/0176344 A1 | 6/2014 | Littlestar |
| 2014/0190691 A1 | 7/2014 | Vinegar |
| 2014/0194657 A1 | 7/2014 | Wadhwa et al. |
| 2014/0299039 A1 | 10/2014 | Trollux |
| 2014/0345370 A1 | 11/2014 | Marotta |
| 2014/0356707 A1 | 12/2014 | Kwon et al. |
| 2015/0081165 A1 | 3/2015 | Yamashita et al. |
| 2015/0144468 A1 | 5/2015 | Skolozdra |
| 2015/0183102 A1 | 7/2015 | Breschi et al. |
| 2015/0198518 A1 | 7/2015 | Borin et al. |
| 2015/0244087 A1 | 8/2015 | Wing |
| 2015/0269288 A1 | 9/2015 | Moore |
| 2015/0323119 A1 | 11/2015 | Giunta |
| 2016/0071059 A1 | 3/2016 | Petering |
| 2016/0091467 A1 | 3/2016 | Morris |
| 2016/0139355 A1 | 5/2016 | Petersen |
| 2016/0169098 A1 | 6/2016 | Makita |
| 2016/0169436 A1 | 6/2016 | Sander et al. |
| 2016/0175634 A1 | 6/2016 | Radian |
| 2016/0238194 A1 | 8/2016 | Adler et al. |
| 2016/0252650 A1 | 9/2016 | Hirst, Sr. |
| 2016/0363249 A1 | 12/2016 | Disher |
| 2016/0369930 A1 | 12/2016 | Poe et al. |
| 2017/0051472 A1 | 2/2017 | Mochimaru |
| 2017/0088401 A1 | 3/2017 | Clements et al. |
| 2017/0122174 A1 | 5/2017 | Patel |
| 2017/0131728 A1 | 5/2017 | Lambert et al. |
| 2017/0158303 A1 | 6/2017 | Michaelis et al. |
| 2017/0248569 A1 | 8/2017 | Lambert et al. |
| 2017/0253737 A1 | 9/2017 | Auld et al. |
| 2017/0253738 A1 | 9/2017 | Auld et al. |
| 2017/0253806 A1 | 9/2017 | Auld et al. |
| 2017/0254481 A1 | 9/2017 | Cadogan et al. |
| 2017/0259229 A1 | 9/2017 | Chou et al. |
| 2017/0306428 A1 | 10/2017 | Helgason et al. |
| 2017/0326474 A1 | 11/2017 | Olovsson |
| 2017/0367346 A1 | 12/2017 | Rees et al. |
| 2018/0002617 A1 | 1/2018 | Umansky et al. |
| 2018/0003116 A1 | 1/2018 | Fersman et al. |
| 2018/0037452 A1 | 2/2018 | Gray et al. |
| 2018/0080356 A1 | 3/2018 | Fukui |
| 2018/0098137 A1 | 4/2018 | Saha |
| 2018/0119882 A1 | 5/2018 | Allidieres et al. |
| 2018/0143734 A1 | 5/2018 | Ochenas et al. |
| 2018/0186528 A1 | 7/2018 | Tonn |
| 2018/0218214 A1 | 8/2018 | Pestun |
| 2018/0223202 A1 | 8/2018 | Fransham et al. |
| 2018/0245313 A1 | 8/2018 | Shibamori et al. |
| 2018/0259064 A1 | 9/2018 | McLemore |
| 2018/0312391 A1 | 11/2018 | Borg |
| 2019/0016963 A1 | 1/2019 | Auld et al. |
| 2019/0121373 A1 | 4/2019 | Panigrahi |
| 2019/0367732 A1 | 5/2019 | Helgason et al. |
| 2019/0270500 A1 | 9/2019 | Hamaoka |
| 2019/0338203 A1 | 11/2019 | Umansky et al. |
| 2019/0359899 A1 | 11/2019 | Umansky et al. |
| 2019/0362147 A1 | 11/2019 | Adam |
| 2019/0136060 A1 | 12/2019 | Helgason et al. |
| 2019/0368054 A1 | 12/2019 | Gummow et al. |
| 2019/0368156 A1 | 12/2019 | Faivre |
| 2020/0033252 A1 | 1/2020 | Borin et al. |
| 2020/0118413 A1 | 4/2020 | Kanukurthy et al. |
| 2020/0232191 A1 | 7/2020 | Prior |
| 2020/0240588 A1 | 7/2020 | Al Khowaiter |
| 2020/0245551 A1 | 8/2020 | Hoffman et al. |
| 2020/0245552 A1 | 8/2020 | Hoffman et al. |
| 2020/0245553 A1 | 8/2020 | Hoffman et al. |
| 2020/0292445 A1 | 9/2020 | Morimoto |
| 2020/0325742 A1 | 10/2020 | Astudillo et al. |
| 2021/0053011 A1 | 2/2021 | Sugiyama et al. |
| 2021/0062697 A1 | 3/2021 | Yokoyama et al. |
| 2021/0073692 A1 | 3/2021 | Saha et al. |
| 2021/0076006 A1 | 3/2021 | O'Neill et al. |
| 2021/0095380 A1 | 4/2021 | Borin et al. |
| 2021/0123211 A1 | 4/2021 | Miller et al. |
| 2021/0138399 A1 | 5/2021 | Yokoyama et al. |
| 2021/0197151 A1 | 7/2021 | Miller |
| 2021/0207772 A1 | 7/2021 | Norton et al. |
| 2021/0215925 A1 | 7/2021 | Kim et al. |
| 2021/0216852 A1 | 7/2021 | Reece et al. |
| 2021/0232163 A1 | 7/2021 | Miller |
| 2021/0232741 A1 | 7/2021 | Ogiso et al. |
| 2021/0348281 A1* | 11/2021 | da Costa ................. C23F 13/22 |
| 2021/0362637 A1 | 11/2021 | Hanis et al. |
| 2021/0381920 A1 | 12/2021 | Jacobsz et al. |
| 2022/0001969 A1 | 1/2022 | Pugnetti |
| 2022/0010707 A1 | 1/2022 | Sharma et al. |
| 2022/0048606 A1 | 2/2022 | Singh |
| 2022/0081261 A1 | 3/2022 | Karbassi |
| 2022/0087099 A1 | 3/2022 | Hoffman et al. |
| 2022/0154427 A1 | 5/2022 | Misaki |
| 2022/0178114 A1 | 6/2022 | Takahama |
| 2022/0186470 A1 | 6/2022 | Chiba et al. |
| 2022/0213603 A1 | 7/2022 | Al Eid et al. |
| 2022/0221368 A1 | 7/2022 | Bergeron |
| 2022/0228345 A1 | 7/2022 | Case et al. |
| 2022/0282651 A1 | 9/2022 | Reynolds et al. |
| 2022/0290411 A1 | 9/2022 | Anahara et al. |
| 2022/0343229 A1 | 10/2022 | Gruber et al. |
| 2022/0401899 A1 | 12/2022 | Miller |
| 2022/0404272 A1 | 12/2022 | Kendall et al. |
| 2023/0012673 A1 | 1/2023 | Fukuyama et al. |
| 2023/0015077 A1 | 1/2023 | Kim |
| 2023/0061824 A1 | 3/2023 | Ell |
| 2023/0078852 A1 | 3/2023 | Campbell et al. |
| 2023/0129513 A1 | 4/2023 | Miller |
| 2023/0259080 A1 | 8/2023 | Whikehart et al. |
| 2023/0259088 A1 | 8/2023 | Borup et al. |
| 2023/0332532 A1 | 10/2023 | Thobe |
| 2023/0333577 A1 | 10/2023 | Miller |
| 2023/0333578 A1 | 10/2023 | Miller |
| 2023/0341092 A1 | 10/2023 | Thobe |
| 2023/0347303 A1 | 11/2023 | Miller |
| 2023/0358023 A1 | 11/2023 | Jordan et al. |
| 2023/0366510 A1 | 11/2023 | Thobe |
| 2023/0383416 A1 | 11/2023 | Ell |
| 2023/0383417 A1 | 11/2023 | Ell |
| 2023/0383418 A1 | 11/2023 | Ell |
| 2023/0392536 A1 | 12/2023 | Thobe |
| 2023/0399817 A1 | 12/2023 | Jordan |
| 2023/0399818 A1 | 12/2023 | Jordan |
| 2023/0407488 A1* | 12/2023 | Ell ......................... G01N 17/02 |
| 2023/0415106 A1 | 12/2023 | Miller |
| 2024/0003016 A1 | 1/2024 | Ell |
| 2024/0141506 A1 | 5/2024 | Ell |
| 2024/0166492 A1 | 5/2024 | Thobe |
| 2024/0209988 A1 | 6/2024 | Thobe |
| 2024/0217498 A1 | 7/2024 | Pittman, Jr. |
| 2024/0255102 A1 | 8/2024 | Thobe |
| 2024/0269626 A1 | 8/2024 | Miller |
| 2024/0271556 A1 | 8/2024 | Thobe |
| 2024/0278762 A1 | 8/2024 | Pittman, Jr. |
| 2024/0278894 A1 | 8/2024 | Ernst |
| 2024/0286726 A1 | 8/2024 | Ernst |
| 2024/0301811 A1 | 9/2024 | Thobe |
| 2024/0327992 A1 | 10/2024 | Ell |
| 2024/0327993 A1 | 10/2024 | Ell |

FOREIGN PATENT DOCUMENTS

| | | |
|---|---|---|
| CA | 2447358 | 4/2005 |
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CA | 2916141 | 6/2017 |
| CN | 2092562 | 1/1992 |
| CN | 200958686 | 10/2007 |
| CN | 100348970 | 11/2007 |
| CN | 102997052 | 3/2013 |
| CN | 202898548 U | 4/2013 |

(56) References Cited

FOREIGN PATENT DOCUMENTS

| | | |
|---|---|---|
| CN | 103106764 | 5/2013 |
| CN | 103497804 | 1/2014 |
| CN | 102997061 | 5/2015 |
| CN | 204824775 | 12/2015 |
| CN | 205640252 | 10/2016 |
| CN | 104372350 B | 2/2017 |
| CN | 106764463 | 1/2019 |
| CN | 110513604 | 11/2019 |
| CN | 210176958 | 3/2020 |
| CN | 111537157 | 8/2020 |
| CN | 114001278 | 2/2022 |
| CN | 115325460 A | 11/2022 |
| CN | 114877263 | 4/2023 |
| EP | 2602609 | 6/2013 |
| EP | 3076461 | 10/2016 |
| EP | 3101411 | 12/2016 |
| EP | 3112011 | 1/2017 |
| EP | 2994626 | 1/2018 |
| EP | 3285759 | 2/2018 |
| ES | 2398302 | 3/2013 |
| FR | 2388762 | 11/1978 |
| FR | 2689241 | 10/1993 |
| GB | 1179978 | 2/1970 |
| GB | 2097687 | 11/1982 |
| GB | 2545207 | 6/2017 |
| GB | 2559149 | 4/2022 |
| IN | 202141001384 | 1/2021 |
| IT | 201900008235 | 12/2020 |
| JP | 2004125039 | 4/2004 |
| JP | 2007204023 | 8/2007 |
| JP | 2008097832 | 4/2008 |
| JP | 2012002159 | 11/2014 |
| JP | 2016078893 | 5/2016 |
| KR | 20110010316 | 2/2011 |
| KR | 20130038986 | 4/2013 |
| KR | 20200007444 A | 1/2020 |
| KR | 102129951 | 7/2020 |
| KR | 102169280 | 10/2020 |
| KR | 102281640 | 7/2021 |
| RU | 2760879 | 12/2021 |
| WO | 1996006685 | 5/1996 |
| WO | 1997006004 | 2/1997 |
| WO | 1997006298 | 2/1997 |
| WO | 1998003711 | 1/1998 |
| WO | 2000063108 | 10/2000 |
| WO | 2002030551 | 4/2002 |
| WO | 2003003002 | 1/2003 |
| WO | 2003066423 | 8/2003 |
| WO | 2004003293 | 1/2004 |
| WO | 2004092307 | 10/2004 |
| WO | 2005018300 | 3/2005 |
| WO | 2007107652 | 9/2007 |
| WO | 2007112335 | 10/2007 |
| WO | 2007149851 | 12/2007 |
| WO | 2009013544 | 1/2009 |
| WO | 2009055024 | 4/2009 |
| WO | 2010042704 | 4/2010 |
| WO | 2010103260 | 9/2010 |
| WO | 2013112274 | 8/2013 |
| WO | 2014089443 | 6/2014 |
| WO | 2014173672 | 10/2014 |
| WO | 2015061868 | 5/2015 |
| WO | 2015153607 | 10/2015 |
| WO | 2016004107 | 1/2016 |
| WO | 2016026043 | 2/2016 |
| WO | 2016146404 | 9/2016 |
| WO | 2017074985 | 5/2017 |
| WO | 2017083778 | 5/2017 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| WO | 2020223803 | 11/2020 |
| WO | 2020237112 | 11/2020 |
| WO | 2021062563 | 4/2021 |
| WO | 2021100054 | 5/2021 |
| WO | 2022043197 | 3/2022 |
| WO | 2022126092 | 6/2022 |
| WO | 2022149501 | 7/2022 |
| WO | 2023287276 | 1/2023 |
| WO | 2023038579 | 3/2023 |
| WO | 2023137304 | 7/2023 |
| WO | 2023164683 | 8/2023 |
| ZA | 9606765 | 2/1998 |
| ZA | 200610366 | 1/2008 |

OTHER PUBLICATIONS

Datta et al., "Advancing carbon management through the global commoditization of CO2: the case for dual-use LNG-CO2 shipping", Carbon Management, 2020, vol. 11, No. 6, 611-630.

Bitoye et al., "Poster Abstract: A Convolutional Neural Network Based Solution for Pipeline Leak Detection", School of Information Technology, Carleton University, Ottawa, Canada, Nov. 2019.

IntelliView, "Thermal Imaging Provides Early Leak Detection in Oil and Gas Pipelines", Petro Industry News, www.Petro-Online.com, Aug./Sep. 2018.

Southwest Research Institute, "Methane Leak Detection", 2021.

Masterduct, "Case Studies: High temp marine grade ship engine exhaust fume hose", retrieved at https://www.masterduct.com/CaseStudies/Hightempshipengineexhaustfumehose.aspx.

Acti, "Advanced Maritime Emissions Control System (AMECS)", retrieved at https://sustainableworldports.org/wp-content/uploads/presentation-on-AMECS.pdf.

Lloyd's Register, Using technology to trace the carbon intensity of sustainable marine fuels, Feb. 15, 2023.

Skelton et al., Onboard Refueling Vapor Recovery Systems Analysis of Widespread Use, Nescaum, Boston MA, Aug. 20, 2007.

Membrane Technology and Research, Inc., Gasoline Vapor Recovery, 2018.

Jordan Technologies, Aereon, Recovering More Vapor = Increased Profits, 2015.

EPFL, Capturing CO2 from trucks and reducing their emissions by 90%, Dec. 23, 2019.

Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.

Information Disclosure Declaration by Kyle E. Miller, Dec. 18, 2020.

Cott Manufacturing Company, FinkLet®/FinkPlate® Cathodic Proection Test Stations, Wayback Machine, May 22, 2000.

International Search Report and Written Opinion for international application No. PCT/US2024/021101 mailed on Oct. 9, 2024.

Borin Manufacturing, Inc., Dart for Test Station, Above Ground Remote Monitoring, Feb. 11, 2021.

Borin Manufacturing, Inc., Commanche Remote Monitoring and Control System, Mar. 24, 2017.

Borin Manufacturing, Inc., Dart for Rectifiers, Remote Monitoring and Control System. Nov. 1, 2017.

Borin Manufacturing, Inc., Stelth 2 Solid-State Reference Electrode for Buried and Concrete Service, Aug. 7, 2015.

Borin Manufacturing, Inc., Stelth 3, Nov. 10, 2016.

Borin Manufacturing, Inc., Stelth Reference Electrodes, Feb. 4, 2016.

Borin Manufacturing, Inc., Stelth Solid-State Reference Electrodes, Nov. 8, 2016.

Borin Manufacturing, Inc., Stelth Reference Electrodes, Oct. 10, 2017.

Borin Manufacturing, Inc., 'Miracle half-cell', Palladium: Borin's new reference electrode chemistry, Aug. 13, 2014.

Borin Manufacturing, Inc., Street Dart, for Test Station, Ground Level Remote Monitoring, Mar. 2017.

(56) References Cited

OTHER PUBLICATIONS

Annex to Form PCT/ISA/206, Communication Relating to the Results of the Partial International Search for international application No. PCT/US2024/021101 mailed Aug. 13, 2024.
Sadovnychiy, Sergiy et al. "Geographical information system applications for pipeline right of way aerial surveillance", International Conference on Geographical Information Systems Theory, Applications and Management, vol. 2, SCITEPress, 2017.
Paschal, Kayla, "Utility Right of Way Management: Potential for Expanded Integrated Vegetation Management in California", 2014.
Neutrik XXR-2 XX Series, https://www.parts-express.com/Neutrik-XXR-2-XX-Series-Color-Coding_Ring-Red, 2022.
Hou, Qingmin, An FBG Strain Sensor-Based NPW Method for Natural Gas Pipeline Leakage Detection, Hindawi, Mathematical Problems in Engineering, vol. 2021, Article ID 5548503, pp. 1-8.
International Search Report and Written Opinion for international application No. PCT/US2024/021099 mailed on Aug. 2, 2024.

\* cited by examiner

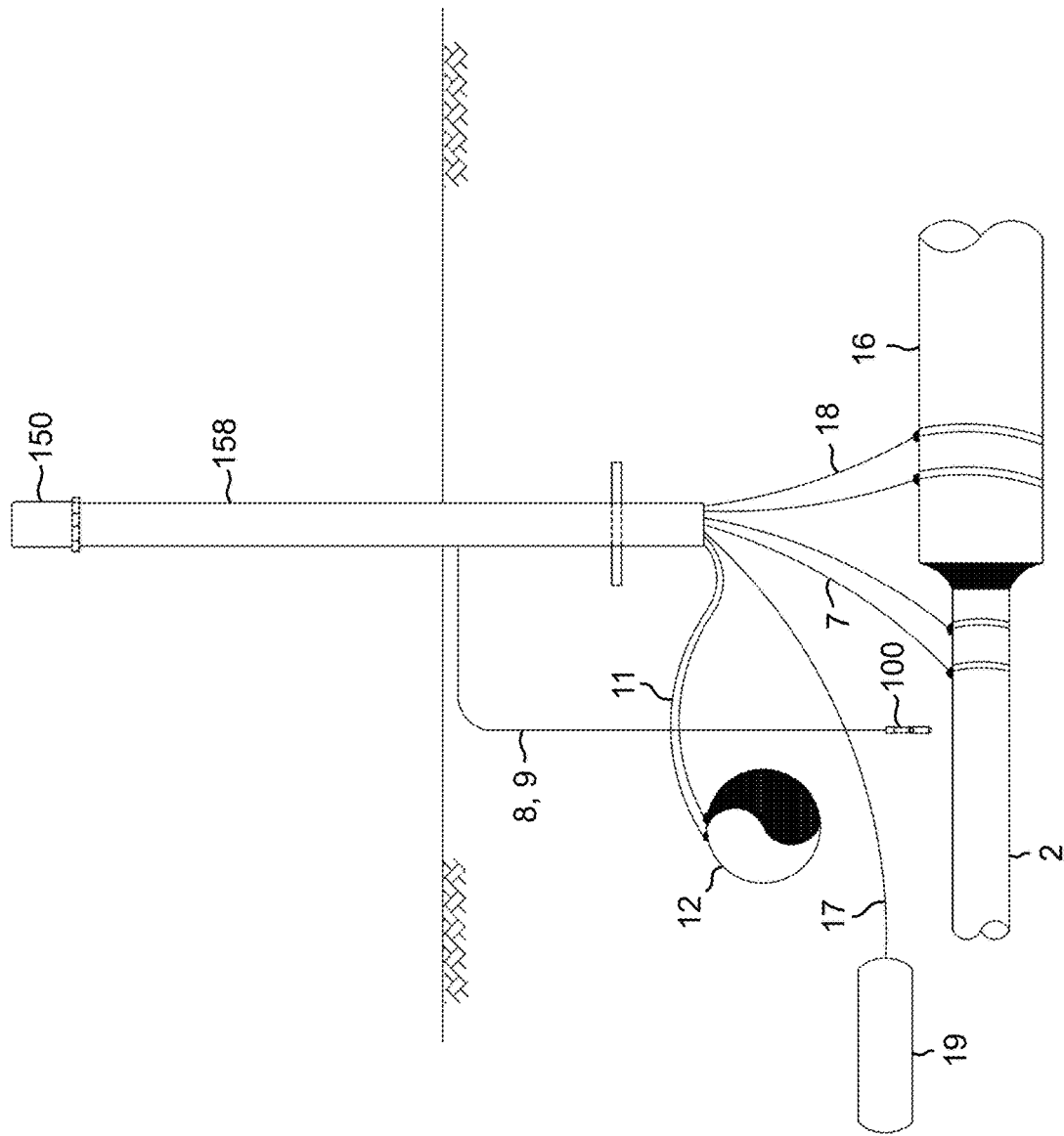

TEST STATION ASSEMBLIES FOR MONITORING CATHODIC PROTECTION OF STRUCTURES AND RELATED METHODS

CROSS-REFERENCE TO RELATED APPLICATION

The present application is a divisional of U.S. application Ser. No. 18/232,855, filed Aug. 11, 2023, titled "TEST STATION ASSEMBLIES FOR MONITORING CATHODIC PROTECTION OF STRUCTURES AND RELATED METHODS," which claims priority to and the benefit of U.S. Provisional Application No. 63/466,056, filed May 12, 2023, titled "TEST STATION ASSEMBLIES FOR MONITORING CATHODIC PROTECTION OF STRUCTURES AND RELATED METHODS," U.S. Provisional Application No. 63/466,062, filed May 12, 2023, titled "TEST STATION ASSEMBLIES FOR MONITORING CATHODIC PROTECTION OF STRUCTURES AND RELATED METHODS," and U.S. Provisional Application No. 63/513,391, filed Jul. 13, 2023, titled "ELECTRODE WATERING ASSEMBLIES AND METHODS FOR MAINTAINING CATHODICMONITORING OF STRUCTURES," the disclosures of each of which are incorporated herein by reference in their entireties. U.S. application Ser. No. 18/232,855 is also a continuation-in-part of U.S. Non-Provisional application Ser. No. 17/886,178, filed Aug. 11, 2022, titled "ASSEMBLIES AND METHODS FOR MONITORING CATHODIC PROTECTION OF STRUCTURES," which is a divisional of U.S. Non-Provisional application Ser. No. 17/805,801, filed Jun. 7, 2022, titled "ASSEMBLIES AND METHODS FOR MONITORING CATHODIC PROTECTION OF STRUCTURES," now U.S. Pat. No. 11,447,877, issued Sep. 20, 2022, which claims priority to and the benefit of U.S. Provisional Application No. 63/365,102, filed May 20, 2022, titled "ASSEMBLIES AND METHODS FOR MONITORING CATHODIC PROTECTION OF STRUCTURES," and U.S. Provisional Application No. 63/260,622, filed Aug. 26, 2021, titled "MINIATURE IR ERROR FREE CATHODIC PROTECTION COUPON ASSEMBLY INSTALLED VIA PROBE," the disclosures of each of which are incorporated herein by reference in their entireties.

BACKGROUND

This disclosure relates to assemblies and methods for monitoring cathodic protection of buried or submerged structures. More particularly, this disclosure relates to assemblies and methods including a cathodic protection coupon monitoring assembly for monitoring the cathodic protection of buried or submerged structures and test station assemblies for monitoring conditions detected using the cathodic protection coupon.

Cathodic protection of metallic structures covered in an electrolyte associated with soil or a fluid is an established technique for reducing the rate of corrosion of the structure. Such cathodic protection may be facilitated by a cathodic protection system, which may use an electrical energy source to provide a cathodic current distributed over the surface of the structure and may take the form of sacrificial anodes, AC-to-DC rectifiers, and/or direct DC sources (such as batteries, solar panels, among others). Once the cathodic protection system has been implemented, the effectiveness of the protection resulting from operation of the cathodic protection system may be assessed by measuring the electrical potential difference between the structure and a reference electrode.

A cathodic protection monitoring assembly used to assess the effectiveness of the cathodic protection system may simulate the conditions of uncoated bare metal of a known surface area on a structure that might normally result from a coating defect. In such a simulation, an electrical potential difference may be measured between a metallic coupon and the surrounding soil or fluid, and this measured electrical potential difference may be compared to cathodic protection criteria for the structure's material to determine whether an active corrosion process is occurring. Accurately measuring the true electric potential difference of the structure, however, has often been difficult, for example, due to errors or offsets resulting from nearby current sources, which may include otherwise uninterruptible sources such as sacrificial anodes directly bonded to the protected structure, foreign rectifiers, stray currents, etc. For example, for situations in which several rectifiers protect the structure, it may be necessary for all the rectifiers to be interrupted simultaneously in order to obtain meaningful measurements that are not affected by electrical current associated with the rectifiers. In addition, the time window with which to measure the potential difference may be relatively brief because, for example, the amount of time between current interruption and depolarization (which refers to the effects of the electrical current as the structure de-energizes and discharges its electric charge) may vary from several seconds to just a fraction of a second, depending on the characteristics of the structure protected by the cathodic protection system and/or the surrounding environment. Furthermore, capacitive spikes that may occur shortly after current is interrupted may also mask the true potential difference intended to be measured.

In an effort to address these challenges, a reference electrode may be incorporated adjacent the metallic coupon in the cathodic protection monitoring system. The reference electrode may allow a technician to obtain error-free structure-to-electrolyte (or electrical potential difference) measurements without a need to interrupt or disrupt nearby current sources. The electrical potential difference may thus be measured reliably without needing to disrupt the current associated with operation of the cathodic protection system to facilitate measurement of the electrical potential difference and/or without knowing the exact soil or fluid conditions and resistance in the vicinity of the measurements.

In addition, a cathodic protection monitoring assembly may include a test station placed at an accessible location to provide a terminal location whereby personnel may measure the electrical potential that is detected by the cathodic protection monitoring assembly. For example, when the cathodic protection monitoring assembly is utilized to monitor the effectiveness of a cathodic protection system for a structure buried under the ground, the test station may be placed above the ground to allow for ease of access to personnel during operations.

Accordingly, Applicant has recognized that there may be a desire to provide improved test stations for cathodic protection monitoring assemblies to improve the functionality of the test stations for obtaining electrical potential measurements during operations. This disclosure may address one or more of the above-referenced considerations, as well as possibly others.

BRIEF SUMMARY

Some embodiments disclosed herein are directed to test station assemblies for a cathodic protection monitoring assembly that include test posts having one or more identification indicators connected thereto that allow efficient and accurate identification of which voltage sources (such as components of a buried/submerged structure, a cathodic protection system, or the cathodic protection monitoring assembly) are electrically connected thereto. In some embodiments, the identification indicators may include one or more identifying characteristics (such as a color and/or a label) so that a technician may quickly identify which test posts on the test station assembly are electrically connected to particular portions of the buried/submerged structure, the cathodic protection system, or the cathodic protection monitoring assembly (each of these particular portions being generally referred to herein as a "voltage source"). Thus, through use of the embodiments disclosed herein, a technician may monitor a cathodic protection system in a more efficient manner and with fewer errors.

Some embodiments disclosed herein are directed to a test station assembly of a cathodic protection monitoring assembly. In an embodiment, the test station assembly includes a face plate including a plurality of openings. In addition, the test station assembly includes a plurality of test posts configured to pass through the plurality of openings. Further, the test station assembly includes a plurality of electrically non-conductive identification indicators configured to connect to the plurality of test posts on the face plate. Each of the plurality of identification indicators including one or more identifying characteristics to identify a corresponding voltage source of a plurality of underground voltage sources associated with an at least partially buried structure, a cathodic protection system for the at least partially buried structure, or the cathodic protection monitoring assembly. Still further, the test station assembly includes a plurality of electrical conductors configured to electrically connect the plurality of test posts to the plurality of underground voltage sources.

In some embodiments, the test station assembly includes a face plate connected to a pole, the pole configured to support the face plate above a ground surface. In addition, the test station assembly includes a test post extended through an opening in the face plate such that the test post includes a first portion on a first side of the face plate and a second portion on a second side of the face plate, the second side being opposite the first side. Further, the test station assembly includes an electrically non-conductive, ring-shaped identification indicator having a bore, the identification indicator connected to the test post such that the second portion of the test post is inserted through the bore. The identification indicator includes one or more identifying characteristics to identify a corresponding voltage source of a plurality of underground voltage sources. The plurality of underground voltage sources are associated with an at least partially buried structure, a cathodic protection system for the at least partially buried structure, or the cathodic protection monitoring assembly, and the corresponding voltage source being electrically connected to the test post.

Some embodiments disclosed herein are directed to a method. In some embodiments, the method includes determining a voltage source electrically connected to an electrical conductor. The voltage source being one of a plurality of underground voltage sources associated with an at least partially buried structure, a cathodic protection system for the at least partially buried structure, or a cathodic protection monitoring assembly. In addition, the method includes selecting a corresponding identification indicator for the electrical conductor based on the voltage source, the identification indicator including at least one identifying characteristic to identify the voltage source. Further, the method includes connecting the electrical conductor and the identification indicator to a test post of a test station assembly of the cathodic protection monitoring assembly, thereby to identify the voltage source electrically connected to the test post on the test station assembly.

Some embodiments disclosed herein are directed to a kit including a container. In addition, the kit includes a plurality of identification indicators positioned in the container, each of the plurality of indicators comprising: (a) at least one identifying characteristic to identify a corresponding voltage source, and (b) an electrically non-conductive material. The plurality of identification indicators comprising annular members that are each configured to at least partially surround a portion of a corresponding test post of a test station assembly of a cathodic protection monitoring assembly. The corresponding voltage source includes one or more of: an at least partially buried structure, an anode of a cathodic protection system for the at least partially buried structure, an electrically conductive coupon of the cathodic protection monitoring assembly, the electrically conductive coupon buried proximate the at least partially buried structure, a reference electrode of the cathodic protection monitoring assembly, the reference electrode buried proximate the at least partially buried structure, another structure that is at least partially buried proximate the at least partially buried structure, piping for an infrastructure station, the piping buried proximate the at least partially buried structure, or a casing pipe surrounding at least a portion of the at least partially buried structure.

Embodiments described herein comprise a combination of features and characteristics intended to address various shortcomings associated with certain prior devices, systems, and methods. The foregoing has outlined rather broadly the features and technical characteristics of some of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various embodiments, reference will now be made to the accompanying drawings in which:

FIGS. 1A, 1B, and 1C are a schematic diagrams illustrating cathodic protection monitoring assemblies including a test station assemblies according to some embodiments of this disclosure;

DETAILED DESCRIPTION

As previously described, a test station may be included in a cathodic protection monitoring assembly for assessing the effectiveness of a cathodic protection system for a buried or submerged structure (such as a buried pipeline). The test station may include one or more test posts that are electrically connected to electrically conductive components of the cathodic protection monitoring assembly (such as the metallic coupon and/or reference electrode, among other components) as well as to the buried or submerged structure itself and/or other components of the cathodic protection system (each of these components generally being referred to herein as "voltage sources" and collectively as "a plurality of voltage source"). Because the test post(s) may be electrically connected to a plurality of buried (and thus underground) or submerged voltage sources, it can be difficult to ascertain which test post is electrically connected to a particular voltage source. As a result, a technician may struggle (or even fail) to locate the particular test post corresponding to the voltage source that is to be measured during operations.

Accordingly, embodiments disclosed herein are directed to test station assemblies that include or incorporate one or more identification indicators that are connected to the test post(s) so as to identify which voltage source associated with a buried/submerged structure, a cathodic protection system for the buried/submerged structure, or a cathodic protection monitoring assembly is electrically connected thereto. In some embodiments, the identification indicators may include one or more identifying characteristics (such a color and/or a label) to identify the corresponding component. Thus, through use of the embodiments disclosed herein, a technician may more efficiently and accurately monitor a cathodic protection system.

Figure 1A:
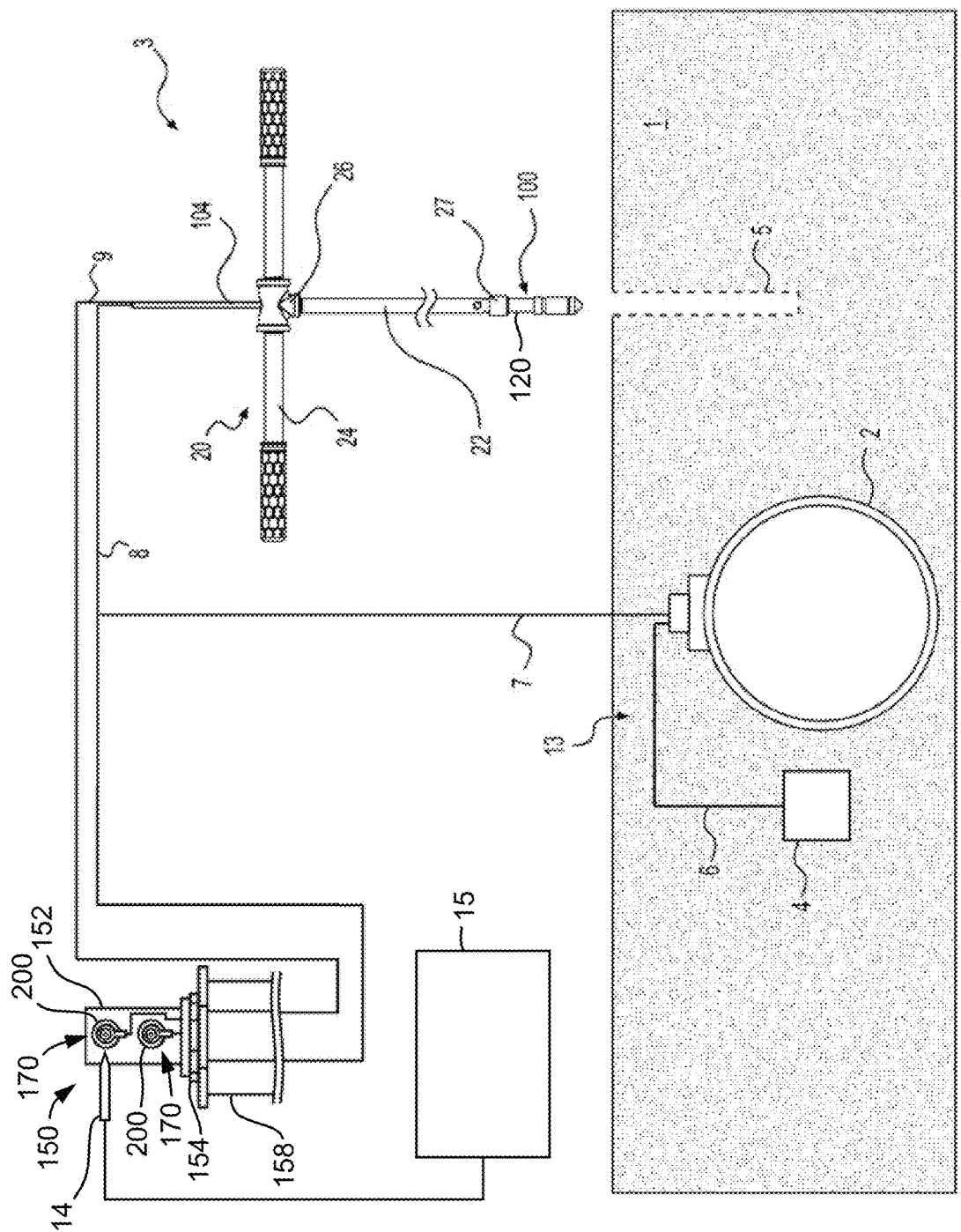

FIG. 1A is a schematic view of example components of a cathodic protection monitoring assembly 3 for monitoring the effectiveness of a cathodic protection system 13 for a buried or submerged structure 2, according to embodiments of the disclosure. As shown in FIG. 1A, the cathodic protection monitoring assembly 3 may include a coupon assembly 100 buried or submerged proximate the structure 2 and a test station assembly 150 electrically connected to the coupon assembly 100. In some embodiments, the coupon assembly 100 may be a voltage drop, error-free coupon assembly. The example coupon assembly 100 may be configured to facilitate potential difference measurements for a structure 2 that is subject to cathodic protection by the cathodic protection system 13 and is at least partially buried in the ground 1 or submerged in a fluid. In the example of FIG. 1A, the structure 2 includes a buried pipeline for transporting hydrocarbons (such as oil, natural gas, renewable hydrocarbons, or other hydrocarbon-based fluids). The cathodic protection system 13 may provide cathodic protection, for example, using a sacrificial anode 4 electrically connected to the structure 2 by a conductor 6, such as a cable. In some embodiments, the cathodic protection monitoring assembly 3 may be configured to provide electrical potential difference measurements that are "instant off" in nature and/or substantially free of voltage drop error.

In some embodiments, a probe rod 20 may be used to insert the coupon assembly 100 into the ground 1, proximate the structure 2. The probe rod 20 may include an elongate rod member 22 extending between a proximal or first rod end 26 and a distal or second rod end 27. A transverse handle or grasping portion 24 may be located at or near the first rod end 26 to provide a technician using the probe rod 20 with enhanced leverage and/or torque for driving the probe rod 20 into the ground 1. In some embodiments, the grasping portion 24 may include a T-handle, for example, as shown in FIG. 1A. In some embodiments, the coupon assembly 100 and probe rod 20 may be the same or similar to the coupon assembly 100 and probe rod described in U.S. Pat. No. 11,447,877, the contents of which are incorporated herein by reference in their entirety.

The coupon assembly 100 may include a test coupon 120 and a reference electrode (not shown) that are electrically connected to the test station assembly 150 via electrical conductors 8, 9 that are contained within a wire bundle 140. Another electrical conductor 7 connected to the structure 2 may also be connected to the test station assembly 150 (either together with electrical conductor 8 or independently).

Figure 1B:
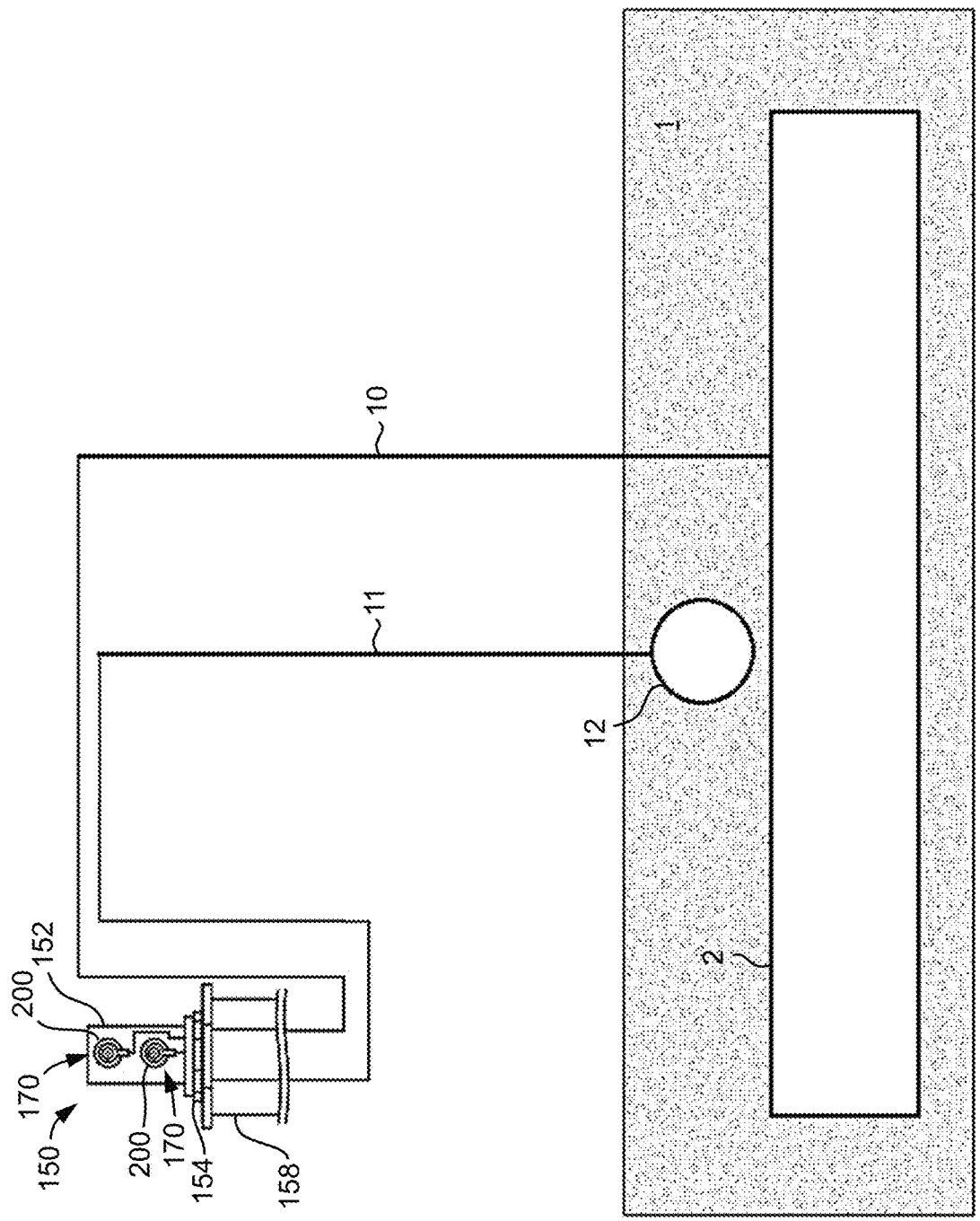

In some embodiments, the cathodic protection system 3 and/or the cathodic protection monitoring assembly 13 may include other electrical connectors (either additional to or alternative to the electrical conductors 7, 8, 9) that may be connected to other buried/submerged voltage sources. For instance, FIG. 1B illustrates an electrical conductor 10 connected to another section or portion of the structure 2 (that is, a different section or portion than that connected to cable 7 as previously described). The another section or portion of the structure 2 may be shifted along a longitudinal axis of the structure 2 relative to the section or portion of the structure 2 that is connected to the electrical conductor 7 shown in FIG. 1A. In addition, FIG. 1B also illustrates an electrical conductor that 11 that is connected to another buried or submerged structure 12 that is separate from and buried proximate to the structure 2. For instance, the other buried or submerged structure 12 may be another independent pipeline and/or piping (or other structures) associated with an infrastructure station (such as a compressor or pump station) for the structure 2 (such as when the structure 2 is a buried hydrocarbon pipeline). The electrical conductors 10, 11 may be connected to the test station assembly 150 either in addition to or in alternative to the electrical conductors 7, 8, 9.

FIG. 1C illustrates one or more electrical conductors 18 that are connected to a casing pipe 16 that is positioned about at least a portion of the structure 2 (such as when the structure is a buried pipeline). Also, FIG. 1C illustrates one or more electrical conductors 17 that are connected to additional anodes 19 that are buried or submerged adjacent the structures 2, 12. Without being limited to this or any other theory, the additional anode(s) 19 may provide direct current (DC) interference mitigation for the structure 2 that may be caused or induced by the additional buried or submerged structure 12. The additional electrical conductors 17, 18 may be connected to the test station assembly 150 either in addition to or in alternative to the electrical conductors 7, 8, 9, 10, 11.

As used herein, the terms "electrical conductor" or "conductor" (such as the conductors 6, 7, 8, 9, 10, 11, 17, 18 described herein), and the like, is meant to broadly include any suitable electrically conductive wave guide that may route or channel electrical current therethrough. Thus, the terms "electrical conductor," "conductor," and the like, specifically include metallic wire(s), and/or cables, and may also include other electrically conductive features, such as connectors, conductive traces, and/or plugs.

The probe rod 20 may be used to stabilize and insert the coupon assembly 100 into a pilot hole 5 formed (such as probed) in the ground 1 adjacent to the structure 2. The coupon assembly 100 may be configured to engage the second rod end 27 of the elongate rod member 22 during assembly of the coupon assembly 100 with the probe rod 20 for installation of the coupon assembly 100 in the ground 1. The wire bundle 140 extends from the coupon assembly 100 and through an internal cavity in the probe rod 20 so that the electrical conductors 8, 9 may be maintained for connection to the test station assembly 150 after the coupon assembly 100 has been installed in the ground 1. Once the coupon assembly 100 is inserted into the ground 1, the probe rod 20 may be disconnected from the coupon assembly 100 and the conductors 8, 9 may be connected to test station assembly 150.

As will be described in more detail below, the test station assembly 150 may include one or more test posts 170 that are electrically connected to one or more (such as one or a plurality of) voltage sources associated with the buried structure 2, the cathodic protection system 13, and/or the cathodic protection monitoring assembly 3 (such as via electrical conductors 6, 7, 8, 9, 10, 11). Specifically, the test post(s) 170 of the test station assembly 150 may be electrically connected to voltage sources including (without limitation) one or more of the coupon assembly 100 (including the test coupon 120 and/or the reference electrode (not shown)), the structure 2 (including multiple sections or portions of the structure 2 as previously described), the anode 4, and the other structure 12 (FIG. 1B). A technician may connect a probe 14 of a voltmeter 15 (or other suitable measurement device such as a potentiometer) to one or more of the test post(s) 170 on the test station assembly 150 to assess the effectiveness of cathodic protection for the structure 2 based on an electrical potential of one or more of the voltage sources.

In addition, in some embodiments, the test station 150 may include one or more electrical switches 130 that may each allow personnel to electrically disconnect a test post 170 from the corresponding component of the cathodic protection system. For instance, in some embodiments, the electrical switch 130 may allow personnel to electrically disconnect the coupon assembly 100 from a test post 170 so as to electrically disconnect the coupon assembly 100 from the cathodic protection system 13.

Further details of embodiments of the test station assembly 150 are described below; however, it should be appreciated that each of the test post(s) 170 includes an identification indicator 200 (or "identification member") that identifies which voltage source is electrically connected to the corresponding test post(s) 170. Thus, utilizing the identification indicator(s) 200, a technician may quickly and accurately measure the electrical potential of the various buried/submerged voltage sources via the test station 150.

Figure 2:
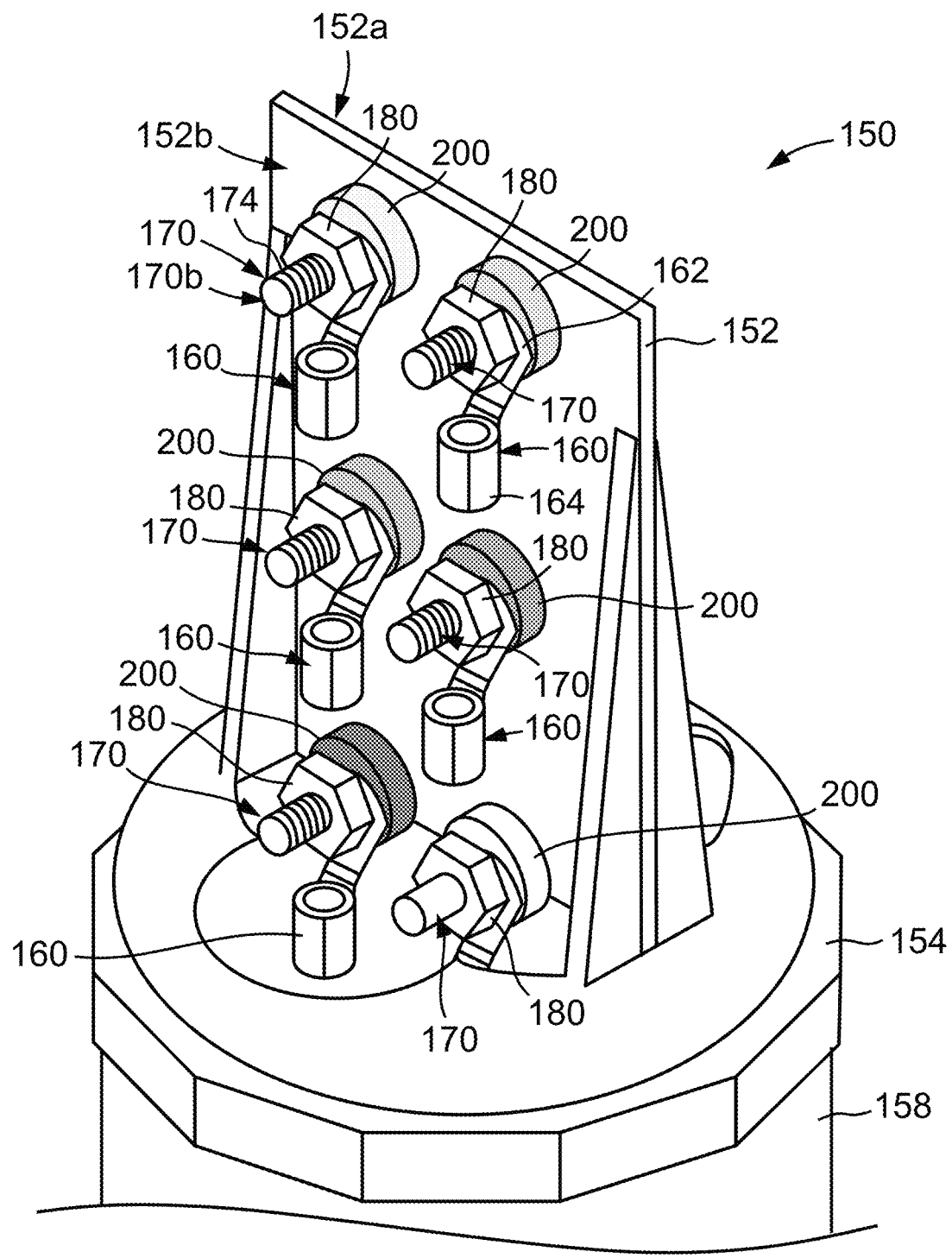
FIG. 2 is a perspective view of the test station assembly of the cathodic protection monitoring assembly illustrated by FIGS. 1A and 1B including identification indicators connected to each of the test posts of the test station assembly according to some embodiments of this disclosure.
Figure 3:
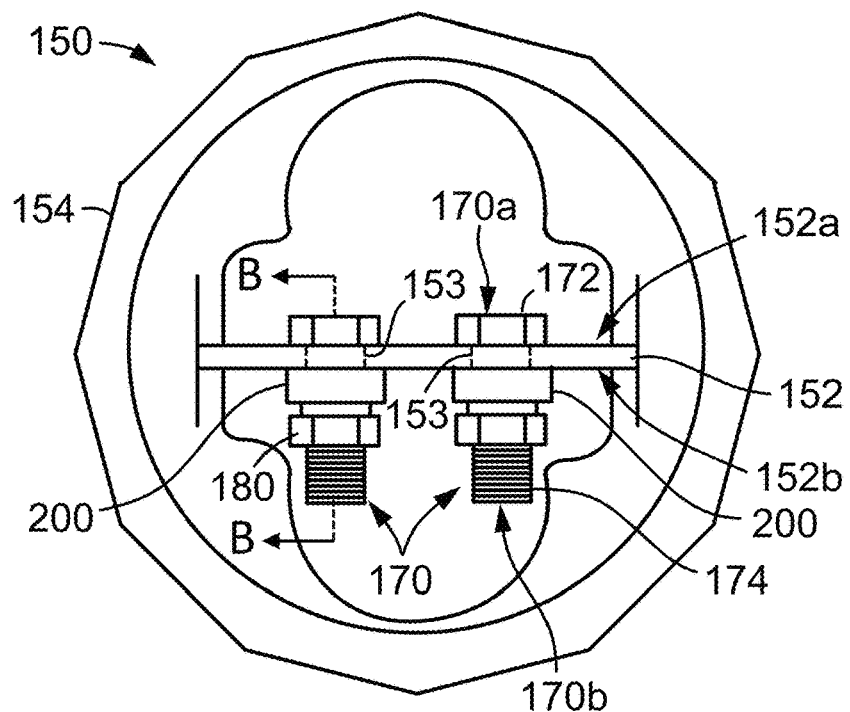
FIG. 3 is a top view of the test station assembly of FIG. 2 according to some embodiments of this disclosure.
Figure 4:
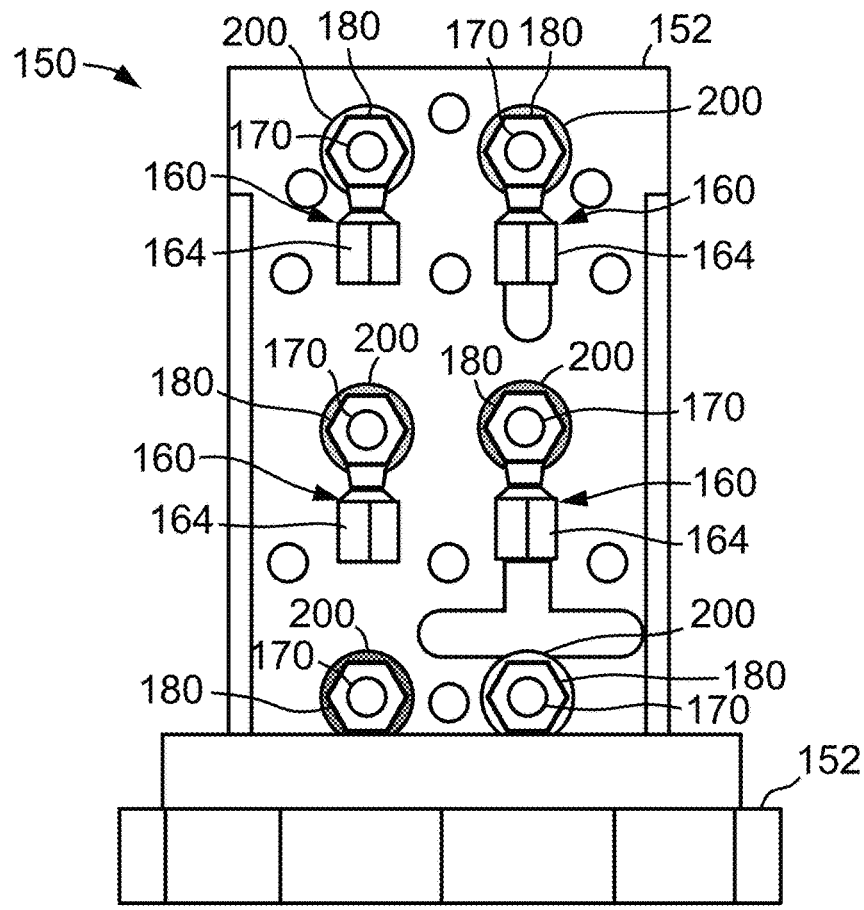
FIG. 4 is a front view of the test station assembly of FIG. 2 according to some embodiments of this disclosure.

FIGS. 2-4 show the test station assembly 150 of the cathodic protection monitoring assembly 3 (FIG. 1) according to some embodiments. The test station assembly 150 includes a face plate 152 that is supported by and extended upward and away from a connector 154. The connector 154, in turn, may be connected to a pole or shaft 158 (FIGS. 1A and 1B).

In some embodiments, the connector 154 may include a female pipe fitting that receives (such as slidingly engages or threadably engages) a corresponding male fitting or end on a pipe (such as the pole 158 as shown in FIG. 2).

The pole 158 may comprise an elongate conduit or pipe (such as galvanized pipe, polyvinyl chloride (PVC) pipe, or other pipe) that is secured to the ground (such as the ground 1 shown in FIG. 1). In addition, the pole 158 may be inserted within or otherwise connected to the connector 154 so as to support and elevate the test station assembly 150 above a surface of the ground 1 (or a "ground surface") to facilitate ease of access to the test station assembly 150 for a technician. In addition, the pole 158 may also function as a conduit for one or more electrical conductors (not shown in FIGS. 2-4), which may correspond to one or more of the conductors 7, 8, 9, 10, 11 shown in FIGS. 1A and 1B, that are connected to the test posts 170 of the station 150.

The face plate 152 supports one or more (six in the illustrated embodiment) test posts 170 that extend or project through apertures (or holes or openings) (see holes or openings 153 in FIGS. 5, 7, and 8) in the face plate 152. The test posts 170 comprise a conductive material, such as, for instance a metallic material (for example, copper, stainless steel, aluminum, or other metallic materials as will be understood by one skilled in the art). As shown in FIG. 3, in some embodiments, the test posts 170 each comprise a threaded bolt having a first end portion (or proximal end portion) 170a and a second end portion (or distal end portion) 170b. An enlarged head 172 may be formed on or at the first end portion 170a, and an elongate threaded member 174 (or "threaded portion") may extend from the head 172 to the second end portion 170b. Each test post 170 may be passed through the corresponding hole 153 in the face plate 152 so that the head 172 is abutted against a first side 152a of the face plate 152, and the threaded member 174 is passed through the hole 153 so that the second end portion 170b is projected or extended away from the face plate 152 on a second side 152b (the second side 152b being opposite the first side 152a).

Each test post 170 may be connected to a suitable cable connector 160 that may, in turn, be connected to one of the electrical conductors extending through the pole 158. Specifically, each cable connector 160 may include an eye 162 and a collar 164. For each test post 170, the threaded member 174 may be passed through the eye 162 and the collar 164 may be engaged with an electrical conductor (such as one of the electrical conductors 6, 7, 8, 9, 10, 11 shown in FIGS. 1A and 1B). Thus, during operations, electricity may be conducted between each test post 170 and a corresponding electrical conductor via the corresponding cable connector 160 (particularly via the eye 162 and collar 164).

As shown in FIGS. 1A and 1B and previously described, the test posts 170 of test station 150 may be electrically connected to a plurality of different voltage sources, such as, for instance, the buried or submerged structure 2 (or multiple portions thereof), one or more components of the cathodic protection system 13, and one or more components of the cathodic protection monitoring assembly 3. Thus, each test post 170 is connected to a corresponding identification indicator 200 that identifies the voltage source (component) that is electrically connected to the corresponding test post 170. For instance, as will be described in more detail below, each identification indicator may have one or more an identifying characteristics, such as a characteristic color and/or a label that visually indicates to a technician which voltage source (or component) is electrically connected to the corresponding test post 170.

As shown in FIGS. 2-4, each test post 170 includes a threaded nut 180 is threadably engaged with the threaded member 174 to secure the test post 170 to the face plate 152. As a result, for each test post 170, the threaded nut 180 may capture and compress the eye 162 of cable connector 160 and identification indicator 200 against the second side 152b of face plate 152.

Figure 5:
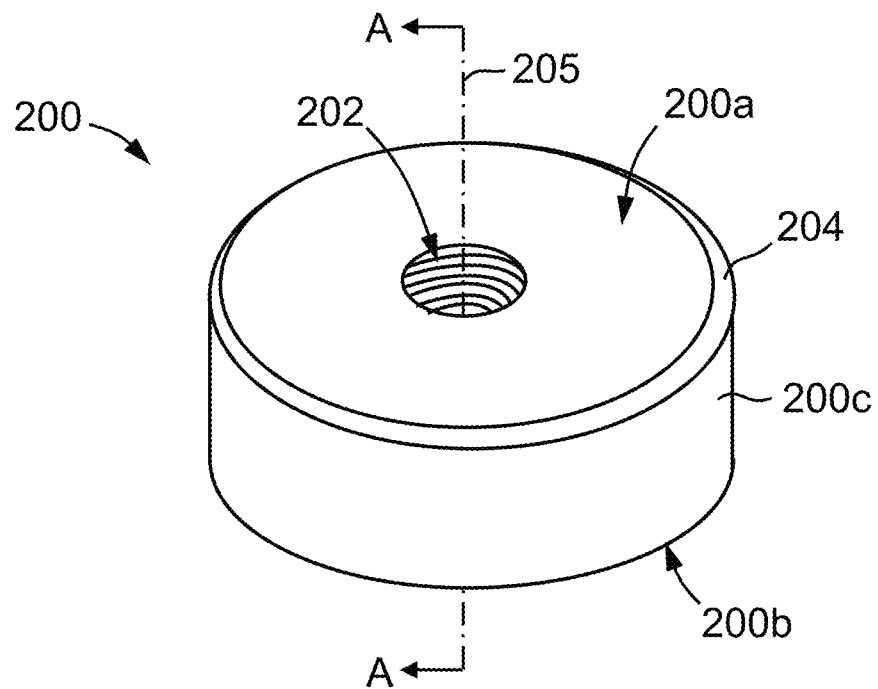
FIG. 5 is a perspective view of one of the identification indicators for use with the test station assembly of FIG. 2 according to some embodiments of this disclosure.
Figure 6:
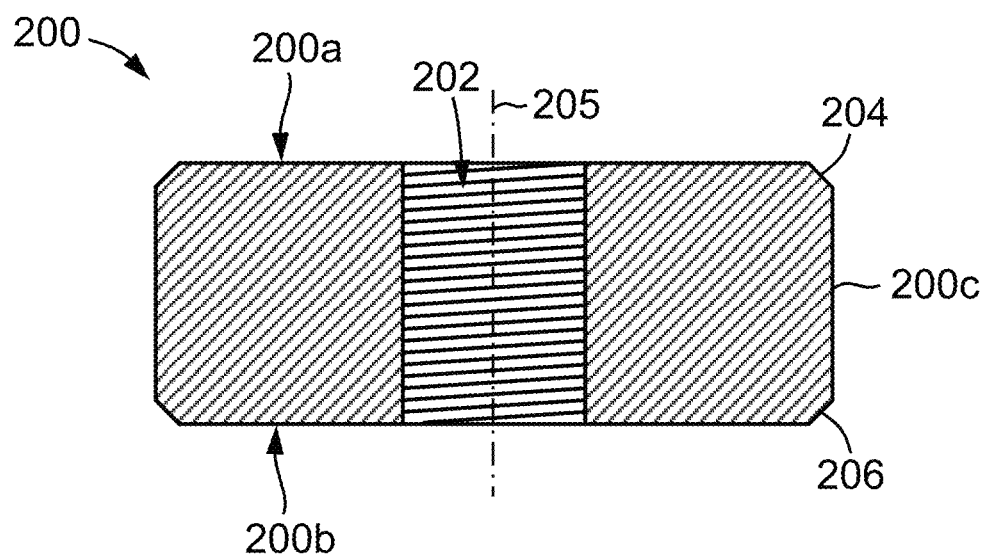
FIG. 6 is a cross-sectional view of the identification indicator of FIG. 5, taken along section A-A in FIG. 5 according to some embodiments of this disclosure.

FIGS. 5 and 6 show one of the identification indicators 200 of the test station 150 illustrated in FIGS. 2-4 according to some embodiments. In some embodiments, the identification indicators 200 may comprise annular members that are configured to at least partially surround (such as circumferentially) the threaded member 174 of a corresponding test post 170. For instance, the identification indicators 200 may include ring-shaped members such as cylindrical washers, spacers, or grommets that receive the threaded member 174 (or "threaded portion") of test posts 170 (FIGS. 2-4) therethrough. However, in some embodiments, the identification indicators 200 may not form a complete ring and may extend less than a full circumference (such as less than a full) 360° about the threaded member 174. Thus, in some embodiments, the identification indicators 200 may be substantially C-shaped. However, other shapes are also contemplated for the identification indicators 200 in other embodiments. For instance, in some embodiments, the identification indicators 200 may include a rectangular, square, or polygonal outer cross-section.

In the embodiment shown in FIGS. 5 and 6, each identification indicator 200 includes a central axis 205, a first side 200a, a second side 200b opposite and spaced from the first side 200a along the central axis 205. In addition, a radially outer surface 200c extends axially between the sides 200a, 200b. In the embodiment illustrated in FIGS. 5 and 6, the radially outer surface 200c is a cylindrical surface; however, other shapes or cross-sections are contemplated (such as square, triangular, rectangular, polygonal, torus, among others) in other embodiments. Without being limited to this or any other theory, an outer cross-section of the outer surface 200c that square, triangular, rectangular, polygonal, or the like may define or include one or more facets or flats along the outer surface 200c that may facilitate the placement or formation of a suitable label thereon (such as labels 210i, 210ii, 210iii, 210iv, 210v, 210vi described herein).

Each of the sides 200a, 200b may include planar surfaces that extend radially relative to the central axis 205. Also, a first chamfer or frustoconical surface 204 extends between the first side 200a and the radially outer surface 200c, and a second chamfer or frustoconical surface 206 extends between the second side 200b and the radially outer surface 200c.

Further, the indicator 200 includes a throughbore 202 that extends axially along central axis 205 from the first side 200a to the second side 200b. In some embodiments, the throughbore 202 includes internal threads, such that the throughbore 202 may be referred to as a threaded bore in some embodiments. However, it should be appreciated that in some embodiments, the throughbore 202 may not include an internal threads and may therefore be a smooth bore.

In some embodiments, each of the identification indicators 200 may comprise an electrically non-conductive material. For instance, in some embodiments, the identification indicators 200 may comprise a polymeric or elastomeric material. In some embodiments, the identification indicators 200 may comprise an epoxy resin. Any suitable manufacturing process may be utilized for the identification indicators 200. For instance, in some embodiments, the identification indicators 200 may be formed via additive manufacturing (such as three-dimensional (3D) printing), a molding process, a machining process (such as cutting, punching, laser cutting, among others), to name a few examples.

Figure 7:
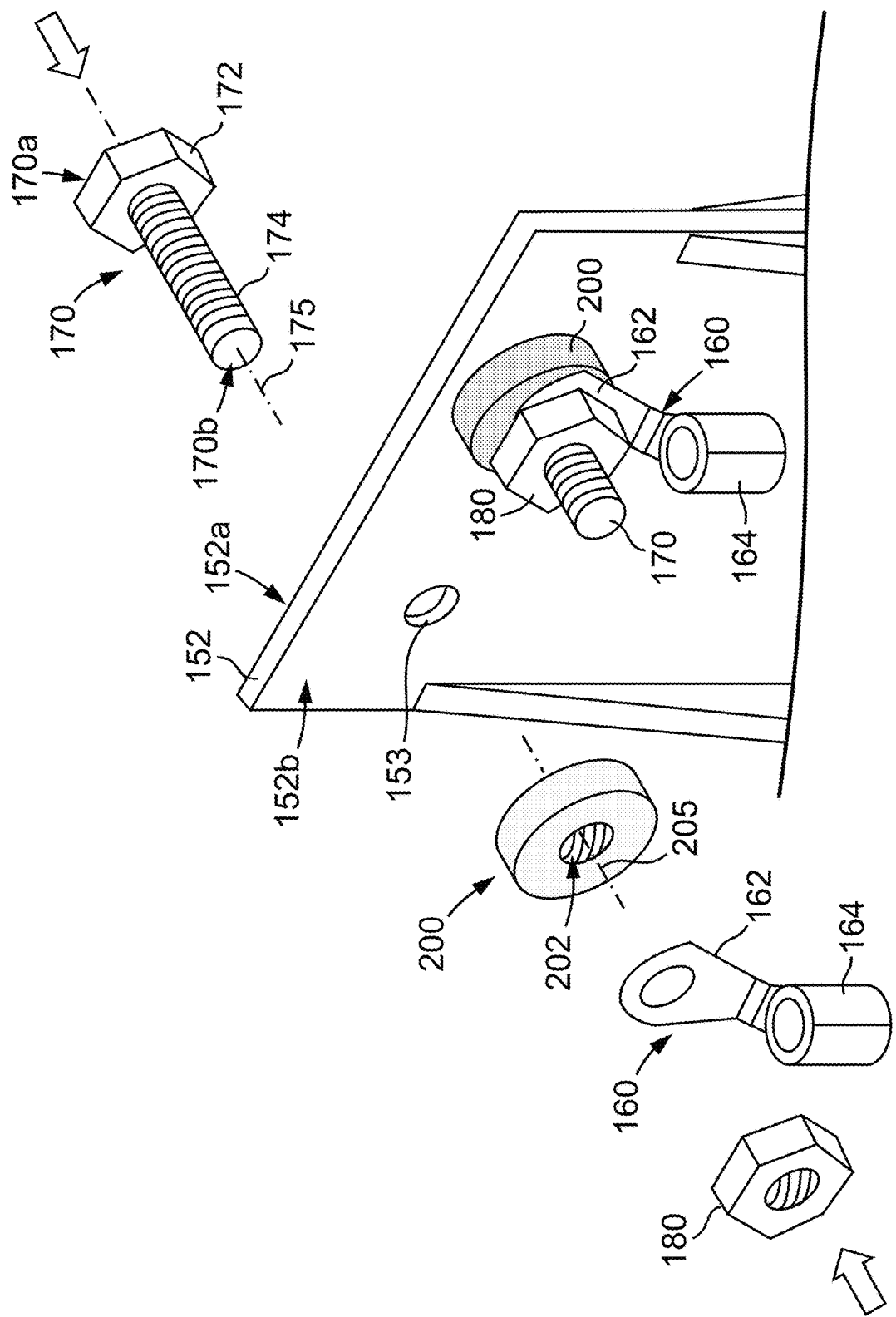
FIG. 7 is An enlarged and partially exploded perspective view of the test station assembly of FIG. 2 according to some embodiments of this disclosure.
Figure 8:
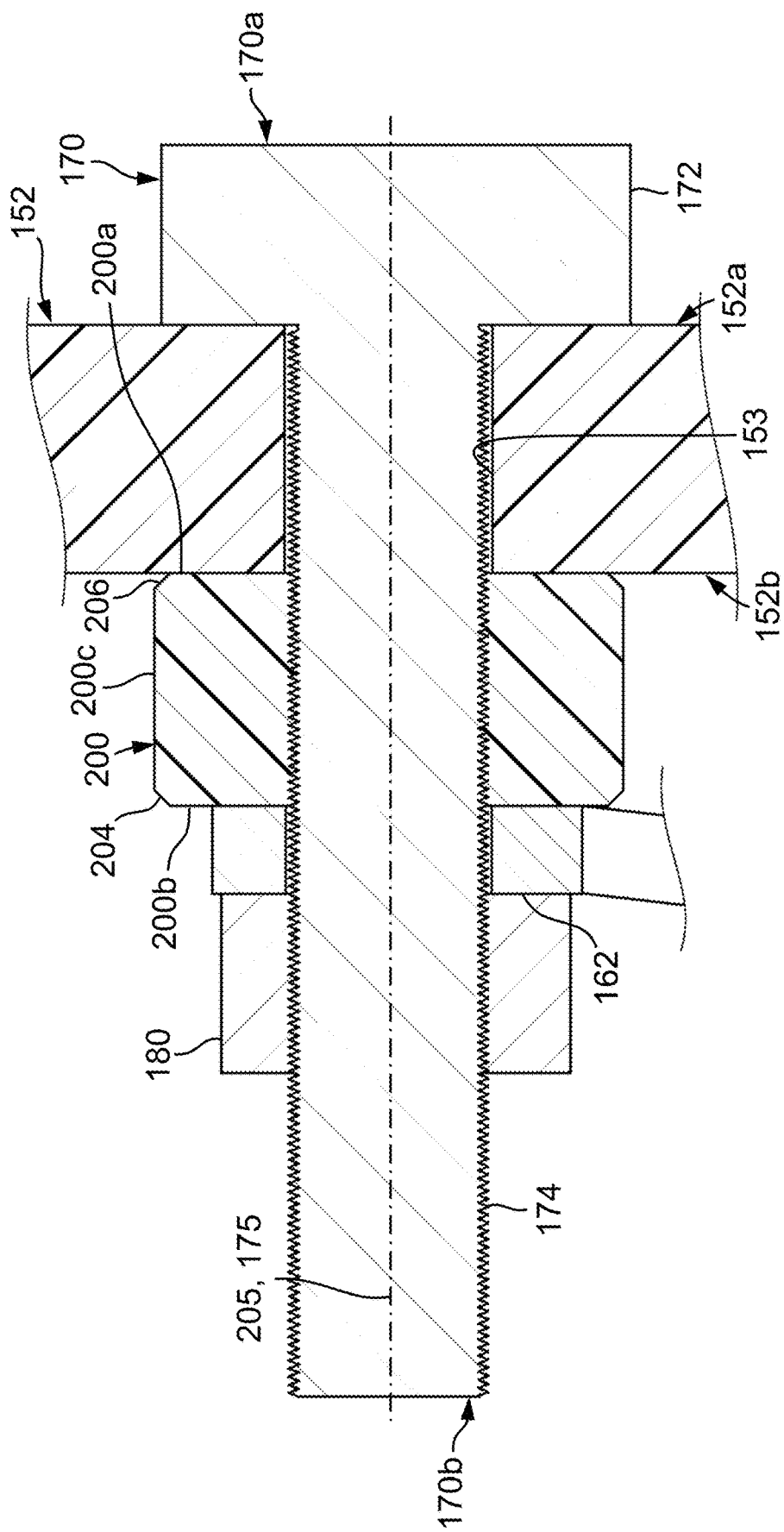
FIG. 8 is a cross-sectional view of one of the test posts installed on the test station assembly of FIG. 2, taken along section B-B in FIG. 3 according to some embodiments of this disclosure.

As shown in FIGS. 7 and 8, each test post 170 is secured to the face plate 152 by inserting the threaded member 174 through the corresponding hole 153 in the face plate 152 so that the head 172 is engaged with the first side 152a of face plate 152 and the threaded member 174 extends through the hole 153 to project (or extend) the second end 170b away from the face plate 152 along the second side 152b. The identification indicator 200 may be connected to the threaded member 174 by inserting the threaded member 174 through the throughbore 202 along the second side 152b of face plate 152 (such that the threaded member 174 is received through the throughbore 202). As previously described, in some embodiments, the throughbore 202 may comprise a threaded bore such that the threaded member 174 is threadably engaged with the throughbore 202 of identification indicator 200. In some embodiments, insertion of the threaded member 174 through the throughbore 202 of identification indicator 200 may coaxially align the central axis 205 of the indicator 200 to a central axis 175 of test post 170.

After identification indicator 200 is connected to threaded member 174 of test post 170, the threaded member 174 is passed through the eye 162 of the cable connector 160, and the threaded nut 180 is threadably engaged with the threaded member 174. Thus, the threaded nut 180 may be threadably engaged with the threaded member 174 until the eye 162 is compressed between the threaded nut 180 and the identification indicator 200 and the identification indicator 200 and eye 162 are both compressed against the second side 1542b of face plate 152 along the axes 205, 175. In the embodiment illustrated in FIGS. 7 and 8, the identification indicator 200 is connected to the test post 170 so that the first side 200a is engaged with the second side 152b of face plate 152 and the second side 200b is engaged with the eye 162 of the cable connector 160. However, it should be appreciated that the identification indicator 200 may be flipped such that the second side 200b engages with the second side 152b of face plate 152 and the first side 200a is engaged with the eye 162 of cable connector 160.

Figure 9:
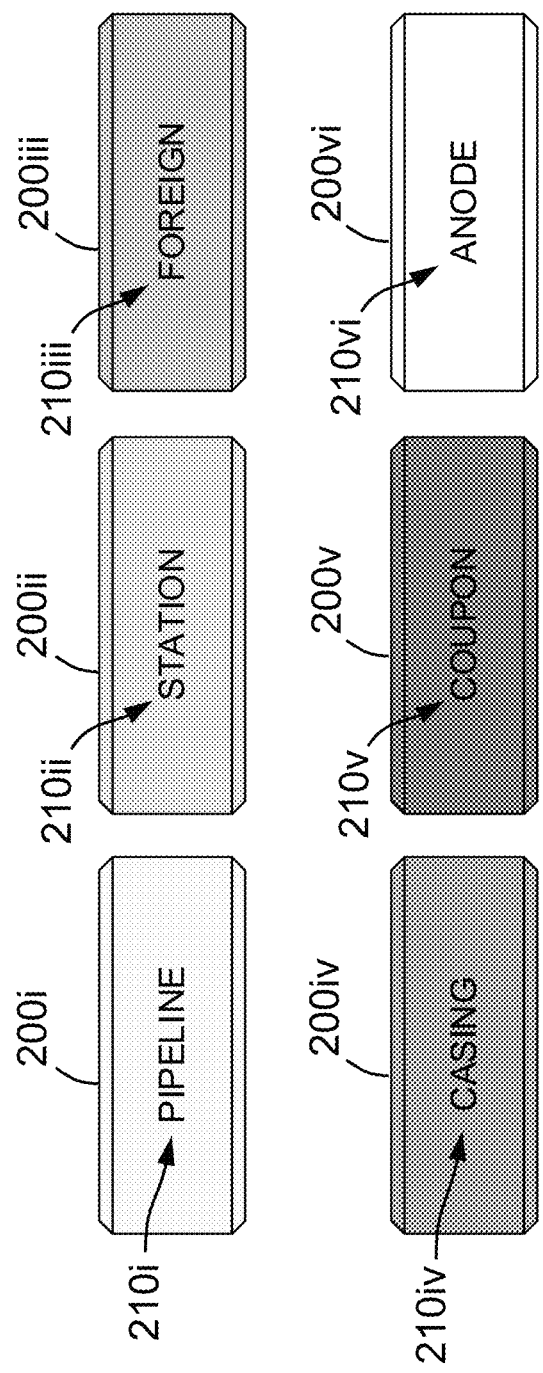
FIG. 9 is a side view of a plurality of example identification indicators for use with the test station assembly of FIG. 2 according to some embodiments of this disclosure.

As shown in FIG. 9, the identification indicators 200 may each include one or more unique identifying characteristics that may be used to identify a particular voltage source (or component) associated with a buried or submerged structure (such as structure 2 shown in FIG. 1), a cathodic protection system for the structure (such as cathodic protection system 13 shown in FIG. 1), and a cathodic protection monitoring assembly (such as cathodic protection monitoring assembly 3 shown in FIG. 1). For instance, FIG. 9 shows a set (or plurality of) identification indicators 200 that may be connected to the test station 150 shown in FIGS. 2-4 according to some embodiments. The identification indicators 200 shown in FIG. 9 are identified separately with reference numerals 200$i$-200$vi$.

Each of the identification indicators 200$i$-200$vi$ includes unique identifying characteristics, such as both a unique color and label, relative to the other identification indicators 200$i$-200$vi$. For example, the identification indicator 200$i$ may have a first color and a first label 210$i$ of "pipeline," the identification indicator 200$ii$ may have a second color and a second label 210$ii$ of "station," the identification indicator 200$iii$ may have a third color and a third label 210$iii$ of "foreign," the identification indicator 200$iv$ may have a fourth color and a fourth label 210$iv$ of "casing," the identification indicator 200$v$ may have a fifth color and a fifth label 210$v$ of "coupon," and the identification indicator 200$vi$ may have a sixth color and a sixth label 210$vi$ of "anode."

With respect to FIGS. 1A, 1B, and 2, the first label 210$i$ ("pipeline") of the identification indicator 200$i$ may indicate that the corresponding test post 170 is electrically connected to the structure 2, the second label 210$ii$ ("station") of the identification indicator 200$ii$ may indicate that the corresponding test post 170 is electrically connected to piping (or other structures) that are associated with an infrastructure station (such as a compressor or pump station) that may be associated with the structure 2 (such as the structure 12 shown in FIGS. 1B and 1C), the third label 210$iii$ ("foreign") of the identification indicator 200$iii$ may indicate that the corresponding test post 170 is electrically connected to another, separate buried or submerged structure (such as the structure 12 shown in FIG. 1B) that is buried or submerged proximate the structure 2, the cathodic protection system 13, and/or the cathodic protection monitoring assembly 3, the fourth label 210$iv$ ("casing") of the identification indicator 200$iv$ may indicate that the corresponding test post 170 is electrically connected to a casing (such as a casing pipe) surrounding the structure 2, the fifth label 210$v$ ("coupon") of the identification indicator 200$v$ may indicate that the corresponding test post 170 is electrically connected to the test coupon 120 of the coupon assembly 100, the sixth label 210$vi$ ("anode") of the identification indicator 200$vi$ may indicate that the corresponding test post 170 is electrically connected to an (such as the anode 4 shown in FIG. 1A or the additional anode 19 shown in FIG. 1C) of the cathodic protection system 13. Still other, different labels are contemplated for use on the identification indicators 200 in other embodiments.

The labels 210$i$, 210$ii$, 210$iii$, 210$iv$, 210$v$, 210$vi$ may be integrally formed (including molded or printed, etc.) on the identification indicators 200$i$, 200$ii$, 200$iii$, 200$iv$, 200$v$, 200$vi$, respectively. Thus, the labels 210$i$, 210$ii$, 210$iii$, 210$iv$, 210$v$, 210$vi$ may be raised outward from or recessed into the radially outer surfaces 200$c$ of the corresponding identification indicators 200$i$, 200$ii$, 200$iii$, 200$iv$, 200$v$, 200$vi$ (FIGS. 5 and 6). In some embodiments, the labels 210$i$, 210$ii$, 210$iii$, 210$iv$, 210$v$, 210$vi$ may be attached to the radially outer surfaces 200$c$ of the identification indicators 200$i$, 200$ii$, 200$iii$, 200$iv$, 200$v$, 200$vi$. The labels 210$i$, 210$ii$, 210$iii$, 210$iv$, 210$v$, 210$vi$ may include words (such as in the examples of the labels 210$i$, 210$ii$, 210$iii$, 210$iv$, 210$v$, 210$vi$ shown in FIG. 9) and/or may include symbols, or any other identifying shapes, symbols, letters, numbers, etc.

Figure 10:
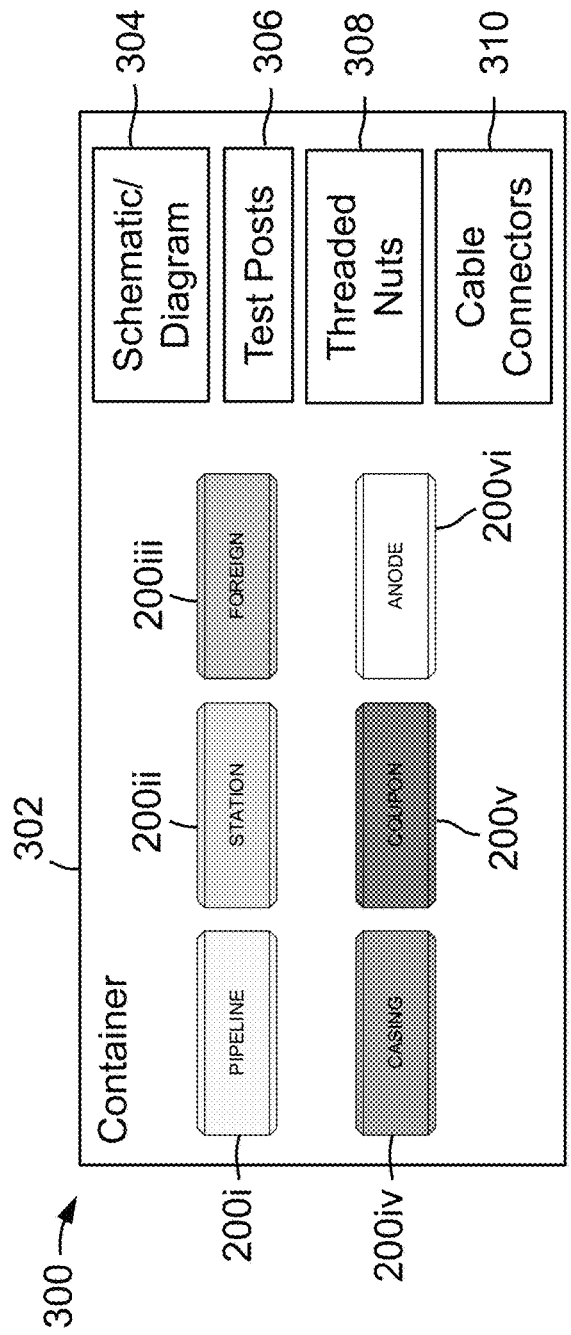
FIGS. 10-13 are schematic diagrams of a kit to provide identification indicators for test posts of a test station assembly of a cathodic protection system of a buried or submerged structure according to some embodiments of this disclosure.
Figure 11:
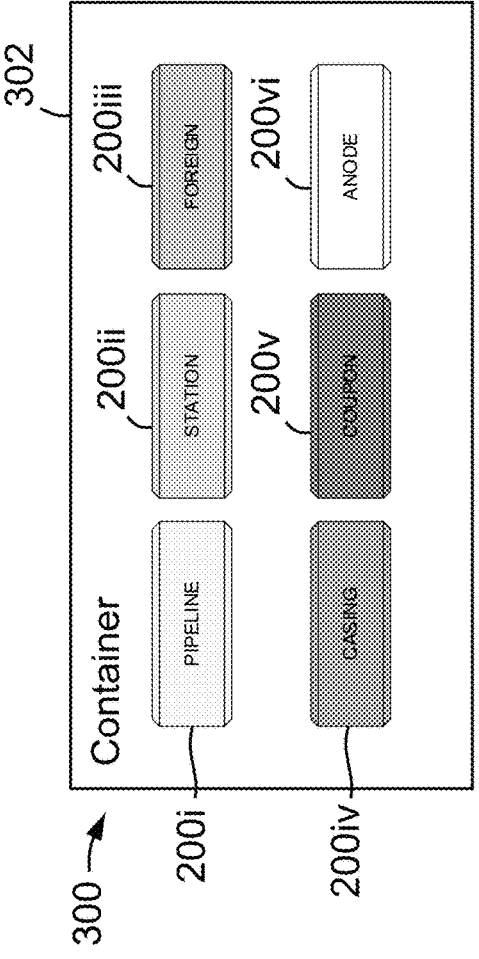

As shown in FIGS. 10 and 11, in some embodiments, one or more components of the test station assembly 150 may be transported to and about a worksite (such as the site associated with the buried or submerged structure 2 illustrated in FIGS. 1A and 1B) in a container 302 as a single kit 300 or assembly. In some embodiments, the kit 300 may facilitate the assessment or monitoring of a cathodic protection system for a buried or submerged structure (such as structure 2 previously described).

As shown in FIG. 10, in some embodiments, the kit 300 may include one or more components of a test station assembly (for example, the test station assembly 150 described herein) such that the kit 300 may be used for the installation (or partial or entire replacement) of a test station assembly for a cathodic protection monitoring assembly (such as assembly 3 described herein). In some embodiments, the kit 300 may be used to install one or more test posts having identification indicators (such as identification indicators 200 described herein) thereon to allow a technician to accurately and quickly identify the appropriate test posts for measuring electrical potential during operations as described herein. Thus, in some embodiments, the kit 300 may include test posts 306, threaded nuts 308, cable connectors 310, and the identification indicators 200$i$-200$vi$ (previously described). The test posts 306, threaded nuts 308, and cable connectors 310 may be the same or similar to the test posts 170, threaded nuts 180, and cable connectors 160, respectively, described herein. In some embodiments, the kit 300 may include one of the identification indicators 200$i$-200$vi$, and corresponding ones of the test posts 306, threaded nuts 308, and cable connectors 310 (such as in the situation where kit 300 is utilized to install, replace, or repair a single test post on a testing station assembly (such as testing station assembly 150).

As is also shown in FIG. 10, in some embodiments, the kit 300 may also include additional components to facilitate installation and/or use of the test station assembly. For instance, in some embodiments, the container 302 of the kit 300 may include a schematic or diagram 304 for installing or assembling the test station assembly (or a component or subassembly thereof).

As shown in FIG. 11, in some embodiments, different combinations or selections of components may be included within the kit 300 (and container 302) than those shown in FIG. 10. For instance, in some embodiments, the kit 300 may include fewer components (or additional components) to those shown in FIG. 10. In one particular example, the embodiment shown in FIG. 11 illustrates the kit 300 including the identification indicators 200$i$-200$vi$ so that kit 300 may be used to retrofit an existing test station assembly to include the identification indicators on the test post(s) thereof.

Figure 13:
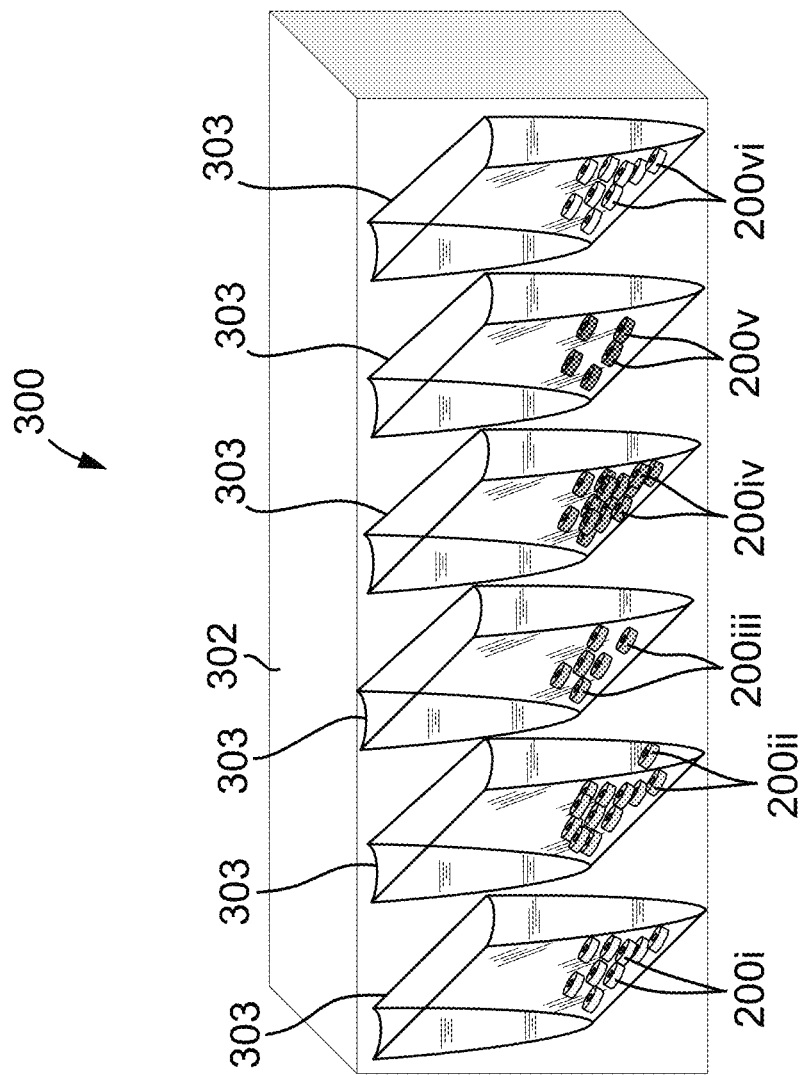
Figure 12:
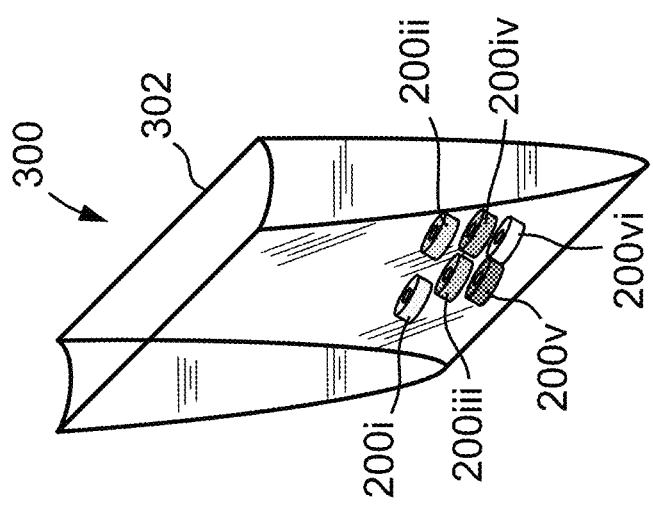

As shown in FIG. 12, in some embodiments, the container 302 may comprise a bag or pouch (such as a plastic bag) that includes or contains the identification indicators 200$i$-200$vi$ shown in FIG. 9 and described herein. Thus, in the embodiment illustrated in FIG. 12, the container 302 may include one of each of the unique identification indicators 200$i$-200$vi$ for installing on a test station assembly (such as test station assembly 150). As shown in FIG. 13, in some embodiments, the container 302 may comprise a box or crate that includes a plurality of sub-containers 303 therein. Each sub-container 303 may comprise a bag or pouch (such as a plastic bag) that includes or contains one or more (such as one or a plurality of) identification indicators 200. In some embodiments, each sub-container 303 may include one or more of a single type of identification indicators (such as one of the identification indicators 200*i*-200*vi*). Thus, a technician may utilize the embodiment illustrated in FIG. 13 to install identification indicators as described herein on multiple test station assemblies and may select the appropriate one or combination of identification indicators 200*i*-200*vi* from the sub-containers 303 during operations. It should be appreciated that still other combinations and selections of components are contemplated for the kit 300 in other embodiments.

Figure 14:
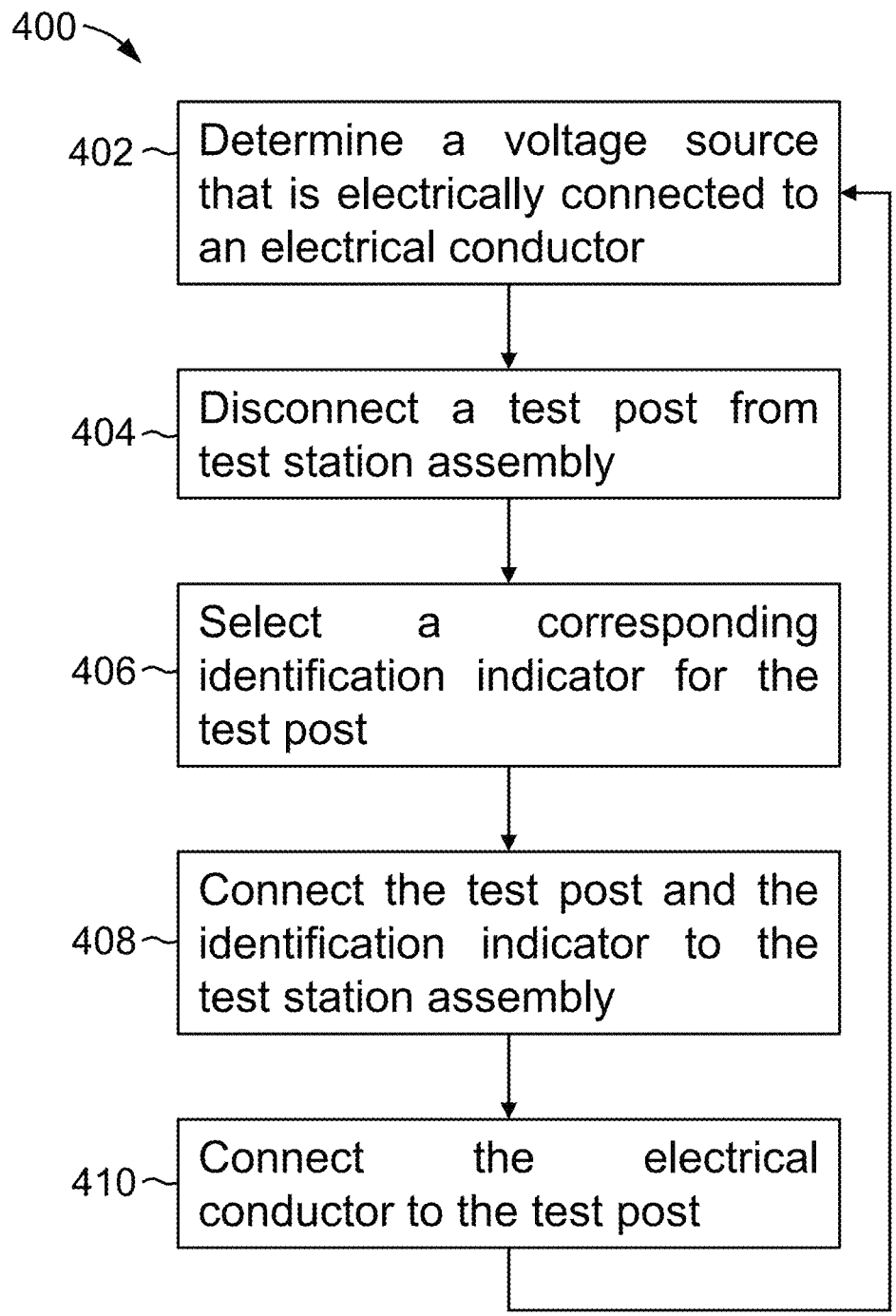
FIG. 14 is a block diagram of a method of installing identification indicators to enhance monitoring at a test station assembly of a cathodic protection monitoring system of an at least partially buried or submerged structure according to some embodiments of this disclosure.

FIG. 14 illustrates a diagram of a method 400 of installing identification indicators to enhance monitoring, at a test station assembly, of a cathodic protection monitoring system of an at least partially buried or submerged structure according to some embodiments. In describing the features of method 400, reference will be made to the cathodic protection monitoring assembly 3, including the test station assembly 150 and identification indicators 200 shown in FIGS. 1A-13 and described herein. However, it should be appreciated that method 400 may be practiced with systems and assemblies that are different from the cathodic protection monitoring assembly 3, test station assembly 150, and identification indicators 200 previously described herein.

Initially, method 400 may include determining a voltage source that is electrically connected to an electrical conductor at block 402. The voltage source may be a buried or submerged structure (such as a buried pipeline as previously described herein), one or more components of a cathodic protection system for the buried or submerged structure, or one or more components of a cathodic protection monitoring assembly to assess the effectiveness of the cathodic protection system.

In addition, the electrical conductor may be a wire (or cable) that is connected to the voltage source and routed to a test station assembly (such as the test station assembly 150 described herein). For instance, as previously described for the cathodic protection monitoring assembly 3 and illustrated in FIGS. 1A and 1B, the electrical conductors 7, 8, 9, 10, 11 may be connected to the structure 2, and one or more components of the coupon assembly 100 (including test coupon 120 and reference electrode—not shown) in some embodiments. In addition, one or more of the electrical conductors 7, 8, 9, 10, 11 may be routed to the test station assembly 150 via the pole 158.

Determining the voltage source (or component) that is electrically connected to an electrical conductor may include using one or more suitable instruments or devices (such as a voltmeter or potentiometer) and/or may include physically tracking the electrical conductor to (or partially to) the voltage source (or component). Still other methods of determining a voltage source that is electrically connected to an electrical conductor at block 402 are contemplated herein.

In addition, method 400 may include disconnecting a test post from a test station assembly at block 404, selecting a corresponding identification indicator for the test post at block 406, connecting the test post and the identification indicator to the test station assembly at block 408, and connecting the electrical conductor to the test post at block 410. In some embodiments, method 400 may be used to update or retrofit an existing test station assembly (such as test station assembly 150 described herein) to include, update, or replace one or more identification indicators (such as the identification indicators 200 described herein) thereon. Thus, block 404 may include disconnecting a test post that either does not include an identification indicator or includes an unsuitable identification indicator (such as because the existing identification indicator incorrectly identifies the corresponding component and/or is damaged). In some embodiments, block 404 may include a partial disconnection of the test post from the test station assembly which may include loosening the test post (or a component thereof) from the test station assembly.

Block 406 may include selecting a suitable identification indicator to connect to the test post on the test station assembly so as to identify the voltage source identified or determined in block 402. More specifically, block 406 may include selecting an identification indicator that includes a color and/or label (such as labels 210*i*-210*vi* shown in FIG. 10) corresponding to the voltage source that is determined to be electrically connected to the electrical conductor in block 402.

Once the identification indicator is selected at block 406, block 408 may include connecting the test post and the selected identification indicator to the test station assembly so that the identification indicator is secured to the test post. As a result, the identification indicator may indicate to a technician which voltage source (or portion of a particular voltage source) is electrically connected to the test post and may prevent a technician from having to re-determine which voltage source is electrically connected to the test post (such as via the method(s) described above for block 402). As previously described for the cathodic protection monitoring assembly 3 and test station assembly 150 shown in FIGS. 1-8, the test post 170 and identification indicator 200 may be connected to the test station assembly 150 (particularly to face plate 152) via a threaded nut 180. In addition, as previously described, the threaded nut 180 may also be used to secure the cable connector 160 to the test post 170 so that the test post 170 is electrically connected to the corresponding electrical conductor via the cable connector 160. As a result, in some embodiments, blocks 408, 410 may be performed together or in concert with one another.

In some embodiments, a test station assembly may include a plurality of test posts that are connected to different voltage sources associated with the buried or submerged structure, the cathodic protection system (system 13 illustrated in FIGS. 1A and 1B), and/or the cathodic protection monitoring assembly (assembly 3 illustrated in FIGS. 1A and 1B). Thus, method 400 (including blocks 402, 404, 406, 408, 410) may be repeated an appropriate number of times so as to install a suitable identification indicator on each (or at least some) of the test posts of the test station assembly.

In some embodiments, an embodiment of method 400 may be used to initially install a test post and identification indicator (or a plurality of test posts and corresponding identification indicators) on a test station assembly. Thus, in such embodiments, the test post may not be pre-installed on the test station assembly, and block 404 (disconnecting the test post from the test station assembly) may be omitted.

The embodiments disclosed herein are directed to test station assemblies that include or incorporate one or more identification indicators that are connected to the test post(s) so as to identify a voltage source electrically connected thereto that is associated with a buried or submerged structure, a cathodic protection system for the buried or submerged structure, and/or a cathodic protection monitoring assembly to assess the effectiveness of the cathodic protection system. In some embodiments, the identification indicators may include a color and/or label to identify the corresponding voltage source. Thus, through use of the embodiments disclosed herein, a technician may monitor a cathodic protection system in a more efficient manner and with fewer errors.

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion herein and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like, when used in reference to a stated value mean within a range of plus or minus 10% of the stated value.

The present application is a divisional of U.S. application Ser. No. 18/232,855, filed Aug. 11, 2023, titled "TEST STATION ASSEMBLIES FOR MONITORING CATHODIC PROTECTION OF STRUCTURES AND RELATED METHODS," which claims priority to and the benefit of U.S. Provisional Application No. 63/466,056, filed May 12, 2023, titled "TEST STATION ASSEMBLIES FOR MONITORING CATHODIC PROTECTION OF STRUCTURES AND RELATED METHODS," U.S. Provisional Application No. 63/466,062, filed May 12, 2023, titled "TEST STATION ASSEMBLIES FOR MONITORING CATHODIC PROTECTION OF STRUCTURES AND RELATED METHODS," and U.S. Provisional Application No. 63/513,391, filed Jul. 13, 2023, titled "ELECTRODE WATERING ASSEMBLIES AND METHODS FOR MAINTAINING CATHODICMONITORING OF STRUCTURES," the disclosures of each of which are incorporated herein by reference in their entireties. U.S. application Ser. No. 18/232,855 is also a continuation-in-part of U.S. Non-Provisional application Ser. No. 17/886,178, filed Aug. 11, 2022, titled "ASSEMBLIES AND METHODS FOR MONITORING CATHODIC PROTECTION OF STRUCTURES," which is a divisional of U.S. Non-Provisional application Ser. No. 17/805,801, filed Jun. 7, 2022, titled "ASSEMBLIES AND METHODS FOR MONITORING CATHODIC PROTECTION OF STRUCTURES," now U.S. Pat. No. 11,447,877, issued Sep. 20, 2022, which claims priority to and the benefit of U.S. Provisional Application No. 63/365,102, filed May 20, 2022, titled "ASSEMBLIES AND METHODS FOR MONITORING CATHODIC PROTECTION OF STRUCTURES," and U.S. Provisional Application No. 63/260,622, filed Aug. 26, 2021, titled "MINIATURE IR ERROR FREE CATHODIC PROTECTION COUPON ASSEMBLY INSTALLED VIA PROBE," the disclosures of each of which are incorporated herein by reference in their entireties.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method comprising:
    determining a voltage source electrically connected to an electrical conductor, the voltage source being one of a plurality of underground voltage sources associated with an at least partially buried structure, a cathodic protection system for the at least partially buried structure, or a cathodic protection monitoring assembly;
    selecting a corresponding identification indicator for the electrical conductor based on the voltage source, the identification indicator including at least one identifying characteristic to identify the voltage source; and
    connecting the electrical conductor and the identification indicator to a test post of a test station assembly of the cathodic protection monitoring assembly, thereby to identify the voltage source electrically connected to the test post on the test station assembly.

2. The method of claim 1, wherein the at least one identifying characteristic includes a color or a label.

3. The method of claim 2, wherein connecting the identification indicator to the test post comprises receiving a portion of the test post through a bore in the identification indicator.

4. The method of claim 3, wherein receiving the portion of the test post through the bore in the identification indicator comprises threadably engaging the portion of the test post with the bore in the identification indicator.

5. The method of claim 3, wherein connecting the electrical conductor and the identification indicator to the test post comprises compressing the identification indicator against a face plate of the test station assembly with a threaded nut threadably engaged with the test post.

6. The method of claim 5, wherein connecting the electrical conductor and the identification indicator to the test post comprises compressing an eye of a cable connector between the identification indicator and the threaded nut along the portion of the test post, the cable connector connected to the electrical conductor.

7. The method of claim 1, wherein the voltage source further includes one or more of:
    the at least partially buried structure,
    an anode of the cathodic protection system,
    an electrically conductive coupon of the cathodic protection monitoring assembly,
    a reference electrode of the cathodic protection monitoring assembly,
    another structure that is buried proximate the at least partially buried structure, piping for an infrastructure station, the piping buried proximate the at least partially buried structure, or a casing pipe surrounding at least a portion of the at least partially buried structure.

8. The method of claim 7, further comprising disconnecting the electrical conductor from the test post prior to the connecting of the electrical conductor and the identification indicator to the test post.

9. A method comprising:
determining a voltage source electrically connected to an electrical conductor, the voltage source including one or more of (a) a plurality of underground voltage sources associated with an at least partially buried structure, (b) a cathodic protection system for the at least partially buried structure, or (c) a cathodic protection monitoring assembly;
selecting a corresponding identification indicator for the electrical conductor based on the voltage source, the identification indicator including at least one identifying characteristic to identify the voltage source; and
connecting the electrical conductor and the identification indicator to a test post of a test station assembly of the cathodic protection monitoring assembly, thereby to identify the voltage source electrically connected to the test post on the test station assembly, the connecting the electrical conductor and the identification indicator to the test post including compressing the identification indicator against a face plate of the test station assembly with a threaded nut threadably engaged with the test post.

10. The method of claim 9, wherein connecting the identification indicator to the test post comprises receiving a portion of the test post through a bore in the identification indicator.

11. The method of claim 10, wherein receiving the portion of the test post through the bore in the identification indicator comprises threadably engaging the portion of the test post with the bore in the identification indicator.

12. The method of claim 11, wherein connecting the electrical conductor and the identification indicator to the test post further comprises compressing an eye of a cable connector between the identification indicator and the threaded nut along the portion of the test post, the cable connector connected to the electrical conductor.

13. The method of claim 9, wherein the voltage source further includes one or more of:
the at least partially buried structure,
an anode of the cathodic protection system,
an electrically conductive coupon of the cathodic protection monitoring assembly,
a reference electrode of the cathodic protection monitoring assembly,
another structure that is buried proximate the at least partially buried structure,
piping for an infrastructure station, the piping buried proximate the at least partially buried structure, or
a casing pipe surrounding at least a portion of the at least partially buried structure.

14. The method of claim 7, further comprising disconnecting the electrical conductor from the test post prior to the connecting of the electrical conductor and the identification indicator to the test post.

15. A method comprising:
determining a voltage source electrically connected to an electrical conductor, the voltage source being one of a plurality of underground voltage sources associated with an at least partially buried structure, a cathodic protection system for the at least partially buried structure, or a cathodic protection monitoring assembly;
selecting a corresponding identification indicator for the electrical conductor based on the voltage source, the identification indicator including at least one identifying characteristic to identify the voltage source; and
connecting the electrical conductor and the identification indicator to a test post of a test station assembly of the cathodic protection monitoring assembly, thereby to identify the voltage source electrically connected to the test post on the test station assembly; and
disconnecting the electrical conductor from the test post prior to the connecting of the electrical conductor and the identification indicator to the test post.

16. The method of claim 15, wherein the at least one identifying characteristic includes a color or a label, and wherein connecting the identification indicator to the test post comprises receiving a portion of the test post through a bore in the identification indicator.

17. The method of claim 16, wherein receiving the portion of the test post through the bore in the identification indicator comprises threadably engaging the portion of the test post with the bore in the identification indicator.

18. The method of claim 17, wherein connecting the electrical conductor and the identification indicator to the test post comprises compressing the identification indicator against a face plate of the test station assembly with a threaded nut threadably engaged with the test post.

19. The method of claim 15, wherein connecting the electrical conductor and the identification indicator to the test post comprises compressing an eye of a cable connector between the identification indicator and the threaded nut along the portion of the test post, the cable connector connected to the electrical conductor.

20. The method of claim 15, wherein the voltage source further includes one or more of:
the at least partially buried structure,
an anode of the cathodic protection system,
an electrically conductive coupon of the cathodic protection monitoring assembly,
a reference electrode of the cathodic protection monitoring assembly,
another structure that is buried proximate the at least partially buried structure,
piping for an infrastructure station, the piping buried proximate the at least partially buried structure, or
a casing pipe surrounding at least a portion of the at least partially buried structure.

* * * * *